US012127615B2

(12) United States Patent
Yao

(10) Patent No.: US 12,127,615 B2
(45) Date of Patent: Oct. 29, 2024

(54) LIGHT-REFLECTIVE MARK FORMED WITH LIGHT- REFLECTIVE YARN

(71) Applicant: CHANCE LINE INDUSTRIAL CO., LTD., Siansi Township (TW)

(72) Inventor: Ming-Hsien Yao, Siansi Township (TW)

(73) Assignee: CHANCE LINE INDUSTRIAL CO., LTD., Siansi Township (TW)

( * ) Notice: Subject to any disclaimer, the term of this patent is extended or adjusted under 35 U.S.C. 154(b) by 569 days.

(21) Appl. No.: 17/443,725

(22) Filed: Jul. 27, 2021

(65) Prior Publication Data

US 2022/0071327 A1 Mar. 10, 2022

(30) Foreign Application Priority Data

Sep. 10, 2020 (TW) ................................ 109131150

(51) Int. Cl.
*G02B 5/12* (2006.01)
*A41D 27/08* (2006.01)
(Continued)

(52) U.S. Cl.
CPC ............. *A41D 27/085* (2013.01); *G09F 3/02* (2013.01); *G09F 13/16* (2013.01); *G09F 21/023* (2020.05);
(Continued)

(58) Field of Classification Search
CPC .............. A41D 27/085; A41D 2500/10; A41D 2500/20; G09F 3/02; G09F 13/16;
(Continued)

(56) References Cited

U.S. PATENT DOCUMENTS 5,379,707 A 1/1995 Asano
9,044,055 B2 * 6/2015 Hehenberger ......... A41D 13/01
(Continued)

FOREIGN PATENT DOCUMENTS

CN 104878505 A 9/2015
JP 3075824 3/2001
(Continued)

OTHER PUBLICATIONS

Kumagoro English Translation: Ideas for embroidery patterns! A simple pattern! _ kumagoro embroidery class Dec. 14, 2019 URL: https://kumagoro26.com/embroidery-pattern-easy/.
(Continued)

*Primary Examiner* — Euncha P Cherry
(74) *Attorney, Agent, or Firm* — Guice Patents PLLC

(57) ABSTRACT

The invention provides a light-reflective mark formed with light-reflective yarn. The light-reflective mark is made on a sheet material, the sheet material is an article that can be sewn or embroidered or a knitted fabric; the light-reflective mark is a pattern formed with graphics and/or texts, and is formed by combining one or more than one light-reflective yarns with the sheet material by sewing, embroidery or weaving. Thereby, daily supplies or clothing can be provided with the light-reflective mark of the invention, so as to improve the safety of daily activities. The light-reflective mark can be made into an aesthetic pattern, or a pattern or a text with a specific shape, such as graphic or text of a logo, so that the article or clothing with the light-reflective mark is fashionably and aesthetically pleasing.

12 Claims, 15 Drawing Sheets

(51) Int. Cl.

| | |
|---|---|
| ***G09F 3/02*** | (2006.01) |
| ***G09F 13/16*** | (2006.01) |
| ***G09F 21/02*** | (2006.01) |

(52) U.S. Cl.
CPC ...... *A41D 2500/10* (2013.01); *A41D 2500/20* (2013.01); *G09F 2003/0282* (2013.01)

(58) Field of Classification Search
CPC .......... G09F 21/023; G09F 2003/0282; D05D 2303/42; D10B 2401/20; D06H 1/043; D03D 15/547; G02B 5/12; G02B 5/128
See application file for complete search history.

(56) References Cited

U.S. PATENT DOCUMENTS

| | | | | |
|---|---|---|---|---|
| 2003/0215631 | A1 | 11/2003 | Kang | |
| 2011/0218665 | A1 | 9/2011 | Katano et al. | |
| 2016/0366954 | A1 * | 12/2016 | Barkshire | A41D 27/085 |
| 2020/0257024 | A1 * | 8/2020 | Abrams | G02B 5/128 |

FOREIGN PATENT DOCUMENTS

| | | |
|---|---|---|
| JP | 3202264 | 1/2016 |
| TW | M438167 U | 10/2012 |
| TW | M516329 U | 2/2016 |

OTHER PUBLICATIONS

Dwyer Ross: “Nike SB Blazer and Janoski Round Out the ”Sashiko“ Pack, shoe with Stitched swoosh”, Jul. 31, 2020, XP055881430, URL: https://hypebeast.com/2020/7/nike-sb-blazer-janoski-kyrie-s2-hybrid-sashiko-pack-release-date-info.

Sweet Nike (甜蜜的耐克)—Gz design_GAYNELL-站酷 ZCOOL https://www.zcool.com.cn/work/ZMTQ3MTM0NDQ =. html Jan. 12, 2016.

* cited by examiner

LIGHT-REFLECTIVE MARK FORMED WITH LIGHT- REFLECTIVE YARN

BACKGROUND OF THE INVENTION

Field of Invention

The invention relates to an object with light-reflective effect, in detail, to a pattern or mark with light-reflective effect.

RELATED ART

In order to improve the safety of night activities, it is a conventional means to dispose light-reflective strips on clothes and make the clothes into light-reflective clothes or light-reflective vests to produce light-reflective effect.

Although disposing the light-reflective strips on the clothes can produce light-reflective effect; however, because the light-reflective strip is in the form of strap or band, it is not aesthetic or fashionable, and thus the clothes provided with the light-reflective strips are not suitable for general wear.

SUMMARY OF THE INVENTION

The invention aims to solve the above-mentioned drawbacks, a main object of the invention is to provide a light-reflective mark that can be used on an article, the light-reflective mark is a pattern or mark formed with a light-reflective yarn, so that the article has a light-reflective safety function, and can be used in various occasions.

Another object of the invention is to provide a light-reflective mark formed with light-reflective yarn, so that the light-reflective mark can be hidden in knitted articles.

The light-reflective mark formed with light-reflective yarn provided by the invention comprises:

- a sheet material being an article that can be sewn or embroidered or a knitted fabric; and
- a light-reflective mark being a pattern formed with graphics and/or texts, the light-reflective mark is formed by combining one or more than one light-reflective yarns with the sheet material by sewing, embroidery or weaving, a line or lines of the light-reflective yarn constitute the pattern of the light-reflective mark, and the pattern of the light-reflective mark is not completely filled with said line of the light-reflective yarn.

Thereby, daily supplies or clothing can be provided with the light-reflective mark of the invention, so as to improve the safety of daily activities. The light-reflective mark made with the light-reflective yarn can be made into an aesthetic pattern, or a pattern or a text with a specific shape, such as graphic or text of a logo, so that the article or clothing with the light-reflective mark is fashionably and aesthetically pleasing, and suitable for wearing in any occasion.

Furthermore, when the light-reflective mark is formed in a knitted article by weaving, the light-reflective mark is hidden in the knitted article. When light shines on the article, the light-reflective mark becomes obvious due to the light-reflection Preferably, the light-reflective yarn comprises a contour line forming the pattern and an inner line disposed in the pattern.

Preferably, the inner line has a plurality of line segments, and the line segments are arranged in the light-reflective mark at intervals.

Preferably, the light-reflective yarn is a contour line forming the pattern.

Preferably, the light-reflective yarn is located in the pattern and forms the inner line of the pattern.

Preferably, the sheet material is a knitted fabric; a yarn woven into the knitted fabric comprises the light-reflective yarn, and the light-reflective mark is woven and formed with the light-reflective yarn. Since the light-reflective mark is woven in the knitted fabric, as if hidden in the knitted fabric, once the light-reflective mark is illuminated, the light-reflective mark will become eye-catching.

BRIEF DESCRIPTION OF THE DRAWINGS

The objects, features, and achieved efficacies of the invention can be understood from the description and drawings of the following preferred embodiments, in which.

DETAILED DESCRIPTION OF THE INVENTION

The invention provides a light-reflective mark capable of reflecting light, the light-reflective mark can be various patterns, any patterns with a fixed graphic, regardless of its style and form, that can be used as a pattern or a mark of the light-reflective mark of the invention.

Figure 1A:
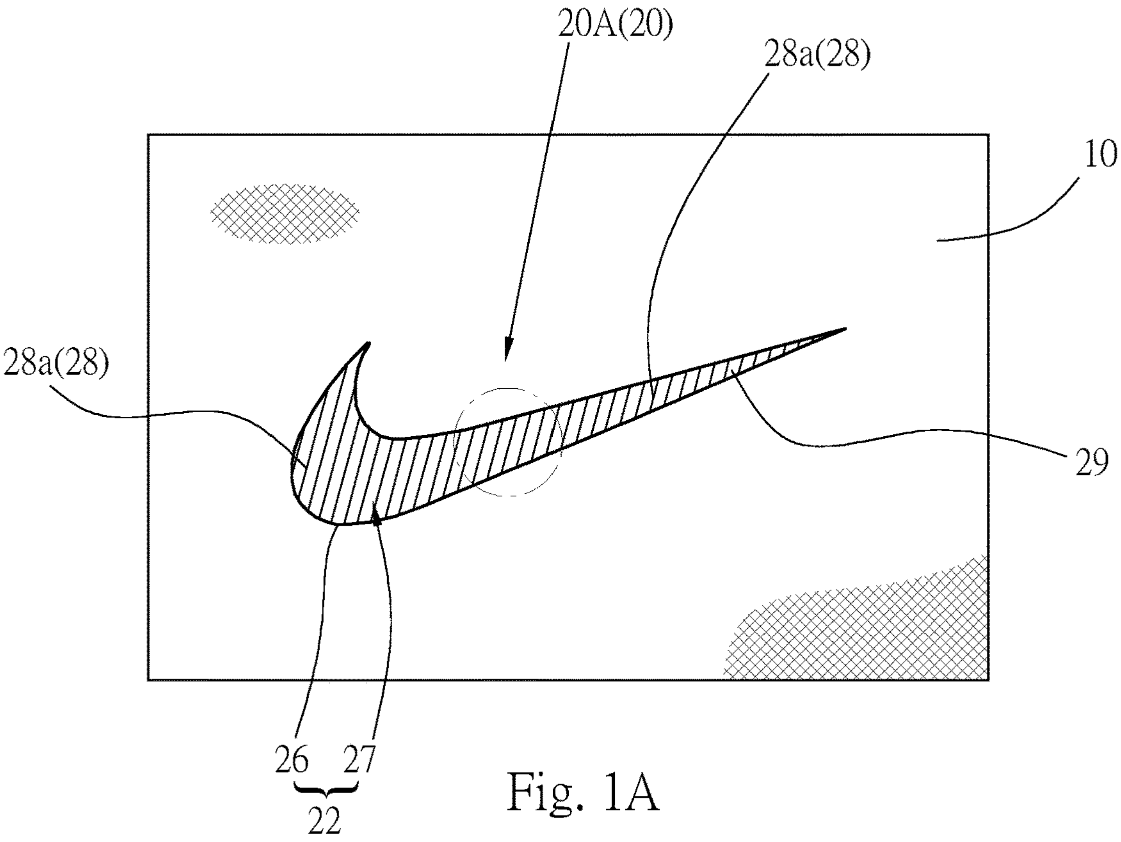
FIGS. 1A and 1B are views of the light-reflective mark of a first preferred embodiment of the invention, showing two graphic patterns of the light-reflective mark.
Figure 1B:
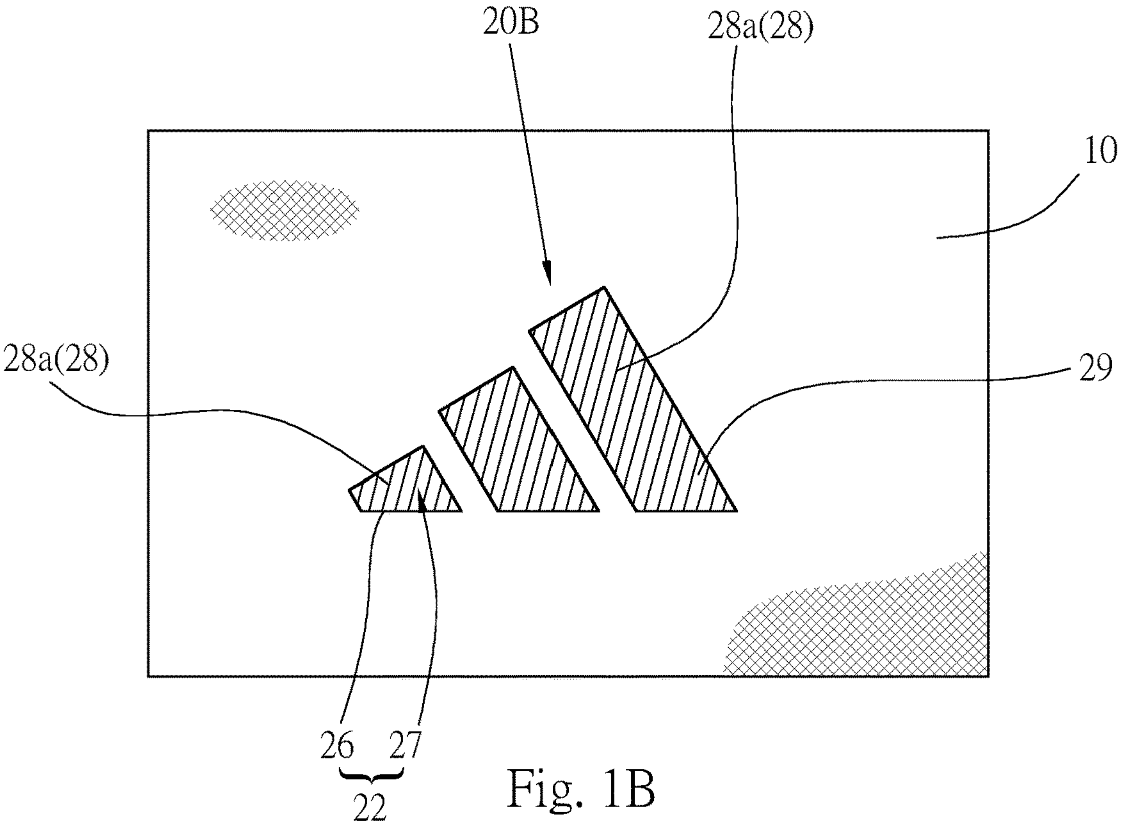
Figure 2A:
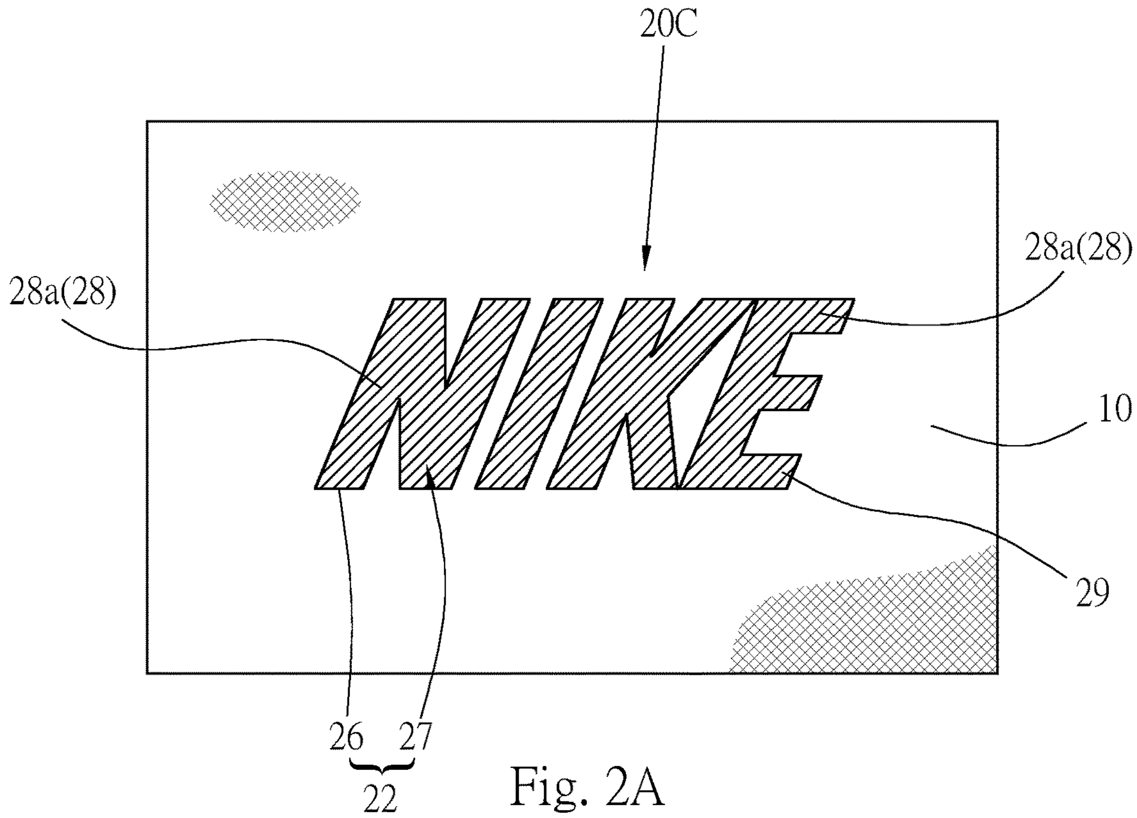
FIGS. 2A and 2B are views of the light-reflective mark of a second preferred embodiment of the invention, showing two text patterns of the light-reflective mark.
Figure 2B:
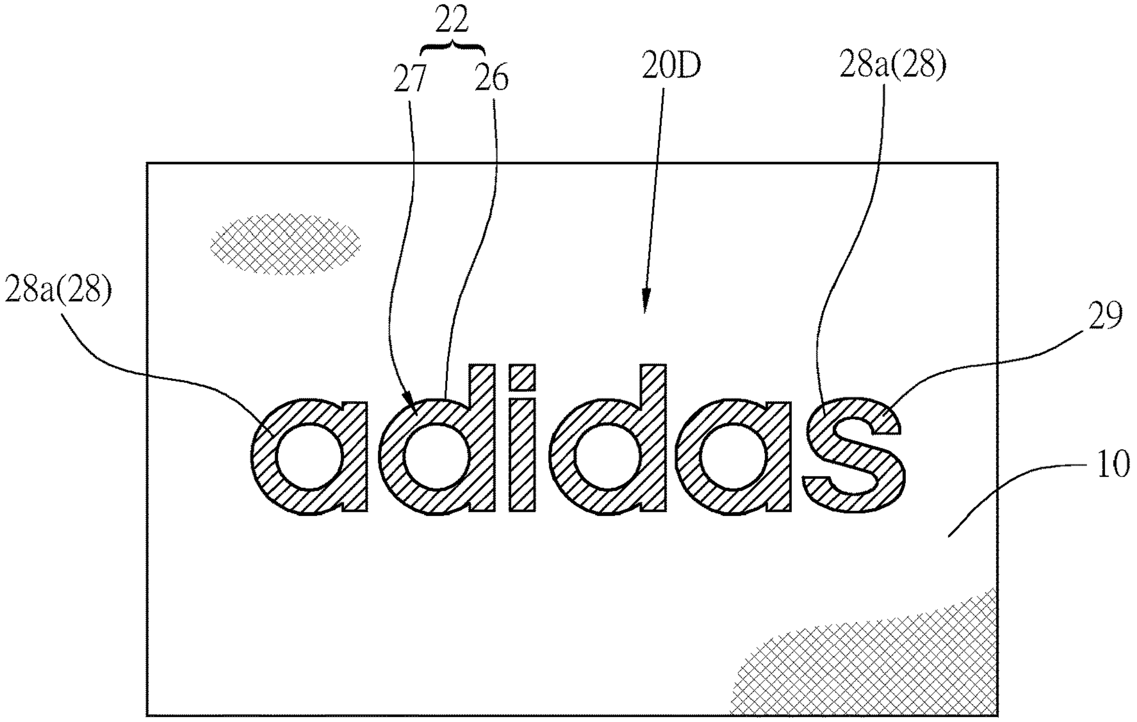

FIG. 1 (FIG. 1A and FIG. 1B) is the light-reflective mark provided by a first preferred embodiment of the invention, and FIG. 2 (FIG. 2A and FIG. 2B) is the light-reflective mark provided by a second preferred embodiment of the invention. The light-reflective mark of the invention can be a pattern or a mark of any style and form, such as a graphic pattern or a text pattern, or a pattern composed of graphics and texts. The graphic pattern can be a graphic of any symbol or sign of any form, and can also be various meaningful or insignificant graphics, including graphics of various logos, trademarks or textual graphics, for example, light-reflective marks 20A and 20B of two types of graphic patterns shown in FIG. 1A and FIG. 1B are respectively the trademark logo of NIKE company and the trademark logo of ADIDAS company. The text pattern can be texts, characters or numbers of various countries, for example, light-reflective marks 20C and 20D of two types of text patterns: NIKE and ADIDAS are respectively shown in FIG. 2A and FIG. 2B. The patterns (graphic patterns and text patterns) disclosed in this specification are merely for exemplifying, and not limitations.

In general, the pattern or mark referred in each of the preferred embodiments in this description is represented by the reference numeral 20; the specific patterns are represented by the reference numerals 20A to 20Z. Please refer to FIGS. 1 and 2, a light-reflective mark 20 of the invention is formed by combining one or more than one light-reflective yarns 22 with a sheet material 10 by sewing with machine, electric embroidery or weaving, the sheet material 10 is an article that can be sewn with machine or electrically embroidered or a knitted fabric, such as cloth material. Specifically, for example, but not limited to, the sheet material 10 can be woven fabric, non-woven fabric (non-woven cloth), paper, leather, plastic sheet, plastic film, rubber sheet, which can be provided for yarns to be sewn with machine or electrically embroidered on the article. The light-reflective yarn 22 can also be woven into the sheet material 10 by a weaving craftsmanship (knitting techniques of plain weaving, circular weaving, knitting, hosiery and bag knitting machine, trademark machine or warp computer jacquard weaving) with other yarns. Specifically, the sheet material 10 is a material for making into various daily supplies, for example, when the sheet material 10 is a fabric, the sheet material 10 can be made into clothes, sportswear, pants, socks, shoes, sports shoes, backpacks, hats, nameplates, scarves, ties, neckerchiefs, napkins, towels, etc. When the sheet material 10 is a leather, the sheet material 10 can be made into leather clothing, leather shoes, leather boots, wallets, briefcases, backpacks, hats, nameplates, etc. When the sheet material 10 is a plastic sheet, a plastic film, or a rubber sheet, the sheet material 10 can be made into raincoats, rain boots, plastic wallets, bags, backpacks, briefcases, nameplates, etc. The sheet material 10 in this specification uses cloth as an example.

Figure 3:
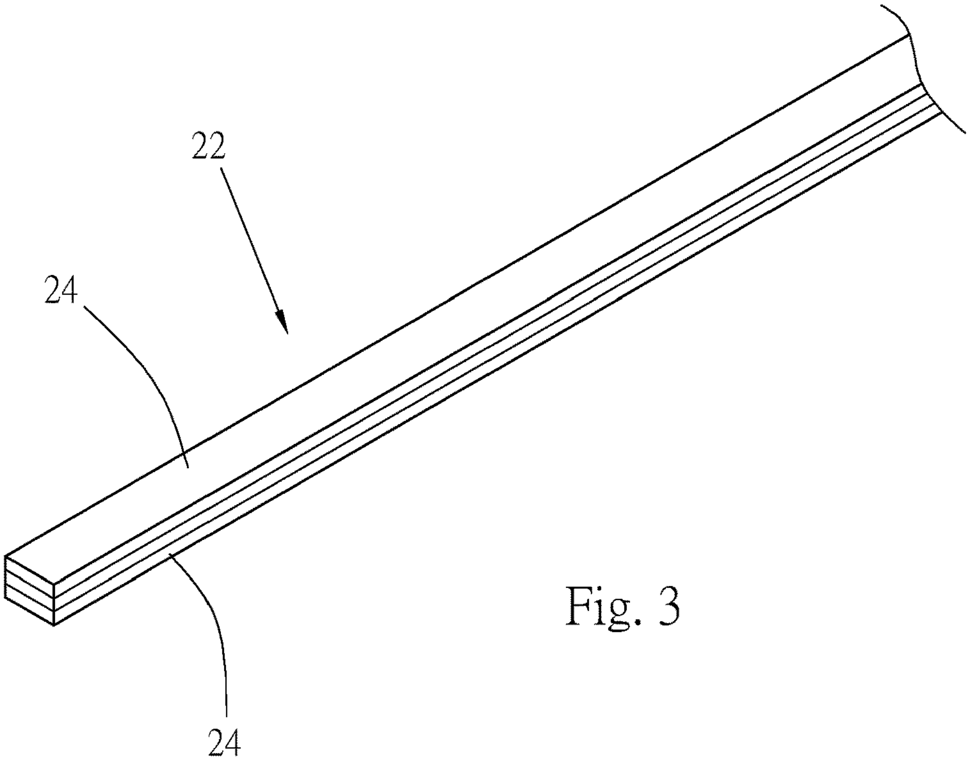
FIG. 3 is an enlarged view of a preferred embodiment of a light-reflective yarn used in the invention.

In the invention, one or multiple light-reflective yarns 22 are used to make the light-reflective mark 20 on the article 10. Please refer to FIG. 3, a diameter W of the light-reflective yarn 22 is between 0.05 and 3 mm, and the light-reflective yarn 22 has a considerable length, such as 3000 meters or more. Two opposite surfaces, such as a top surface and a bottom surface of the light-reflective yarn 22 respectively have a light-reflective layer 24, and each of the light-reflective layers 24 has a plurality of tiny glass microbeads capable of causing the light-reflective yarn 22 to produce a light-reflective effect. The light-reflective yarn 22 made by the applicant of the invention has a considerable strength and can be used as a sewing thread, an embroidery thread or a yarn for weaving, and can be combined with the sheet material 10 through sewing with machine, electric embroidery or weaving, as described hereunder, the light-reflective yarn 22 of each of the embodiments is also combined with the sheet material by sewing with machine, electric embroidery or weaving techniques. The invention relates to the application of the light-reflective yarn 22, as for how the light-reflective yarn 22 is made or the specific light-reflective structure thereof, is not a main subject matter of the invention. The light-reflective yarns disclosed in the previous patent applications filed by the applicant can be provided for reference.

Figure 4:
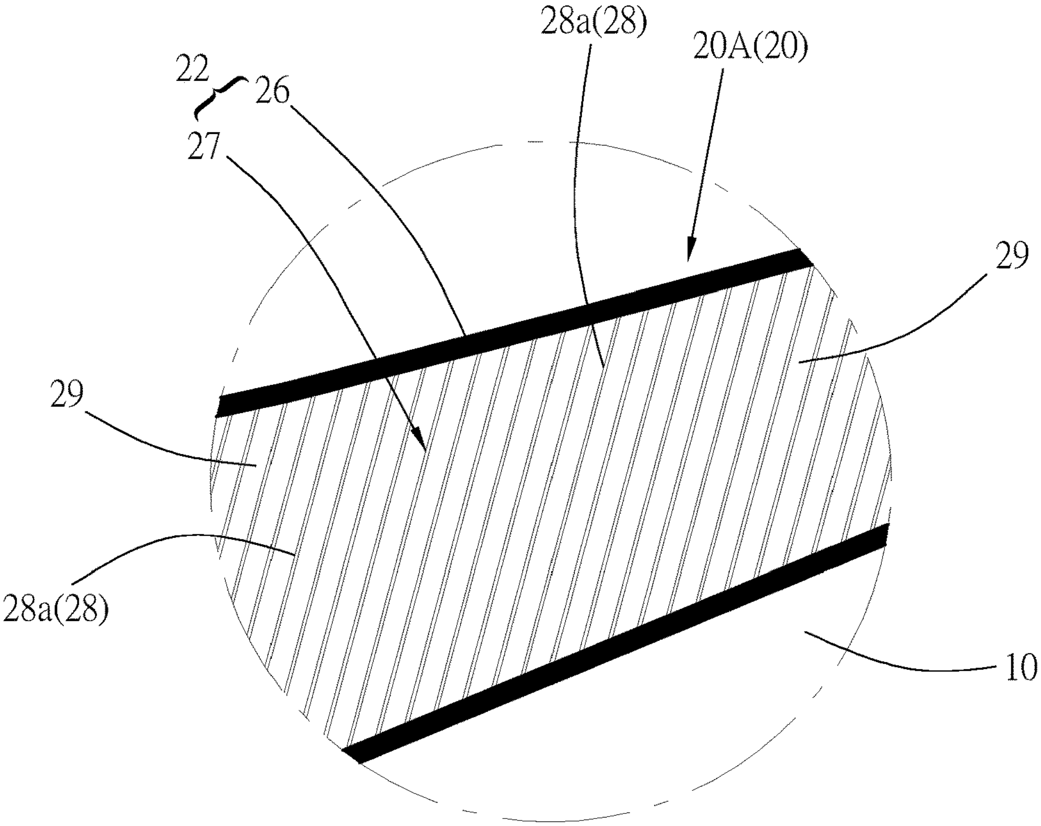
FIG. 4 is a partial enlarged view of FIG. 1A.

As shown in FIGS. 1 and 2, the light-reflective yarn 22 is sewn by machine, electro-embroidered, or woven on the sheet material 10 to form the light-reflective marks 20A, 20B of graphic patterns or the light-reflective marks 20C, 20D of text patterns. In the embodiment of FIGS. 1 and 2, taking the light-reflective mark 20A of FIGS. 1A and 4 as an example, lines of the light-reflective yarn 22 forming the light-reflective mark 20A include a contour line 26 and an inner line 27. The contour line 26 constitutes an outer contour of the light-reflective mark 20A based on a shape of the light-reflective mark 20A, and the inner line 27 is disposed in the pattern of the light-reflective mark 20A according to a shape of the light-reflective mark 20A, that is, disposed inside the contour line 26. The contour line 26 and the inner line 27 can be formed with the same light-reflective yarn 22; or formed with different light-reflective yarns 22, for example, the contour line 26 is sewn by machine, electro-embroidered or woven with one or more than one light-reflective yarns 22, and the inner line 27 is sewn by machine, electro-embroidered or woven with the other one or more than one light-reflective yarns 22. The contour line 26 and the inner line 27 may have different reflective colors.

In each of the light-reflective marks 20A to 20D in FIGS. 1 and 2, the inner line 27 has a plurality of line segments 28 (the line segments 28 in this preferred embodiment are represented by the reference numeral 28*a*) disposing in the pattern of the light-reflective mark 20, for example, linear line segments, the line segments 28 (28*a*) are lines and are spaced apart and have intervals, and the light-reflective mark is not completely filled with the line segments 28 (28*a*), that is, a gap 29 is disposed between two adjacent line segments 28*a*, two ends of each of the line segments 28(28*a*) are connected with the contour line 26; the line segments 28*a* are disposed in parallel in this embodiment. The line segments 28*a* of the inner line 27 of each of the light-reflective marks 20B to 20D are disposed in a same manner as the line segments 28*a* of the light-reflective mark 20A, the line segments 28 (28*a*) are lines and are spaced apart and arranged in parallel. A thickness of the lines of the light-reflective yarn 22 (that is, the contour line 26 and the line segments 28 of the inner line 27) described in this specification is not limited, and a width of the contour line 26 and each of the line segments 28 can be one time to tens or hundreds of times the diameter W of the light-reflective yarn 22. For example, the width of the contour line 26 and each of the line segments 28 is between 0.05 mm and 12 mm, preferably between 0.1 mm and 10 mm. In addition, arrangement density or quantity of the line segments 28 are not limited, and can be changed according to actual requirements.

The light-reflective mark 20 of the invention can be made on various daily supplies (the sheet material 10 is a material of the various daily supplies), such as but not limited to daily supplies of clothes, sportswear, scarves, ties, neckerchiefs, napkins, towels, shoes, sports shoes, leather bags, backpacks, briefcases, wallets, hats, nameplates, raincoats, rain boots, etc.

When in use, and when light irradiates the light-reflective marks 20A to 20D, the light-reflective marks 20A to 20D reflect light so that others can see the reflection of light of the light-reflective marks 20A to 20D, thereby providing public safety. In the embodiment of FIG. 1 and FIG. 2, although the light-reflective marks 20A to 20D are not completely filled with the line segments 28*a* of the inner line 27, through blooming or glowing of light, what others see are still the complete patterns of the light-reflective marks 20A to 20D.

In general, the line segment of the inner line 27 referred in this description is represented by the reference numeral 28; the specific line segments are represented by the reference numbers 28*a* to 28*e*.

Figure 5A:
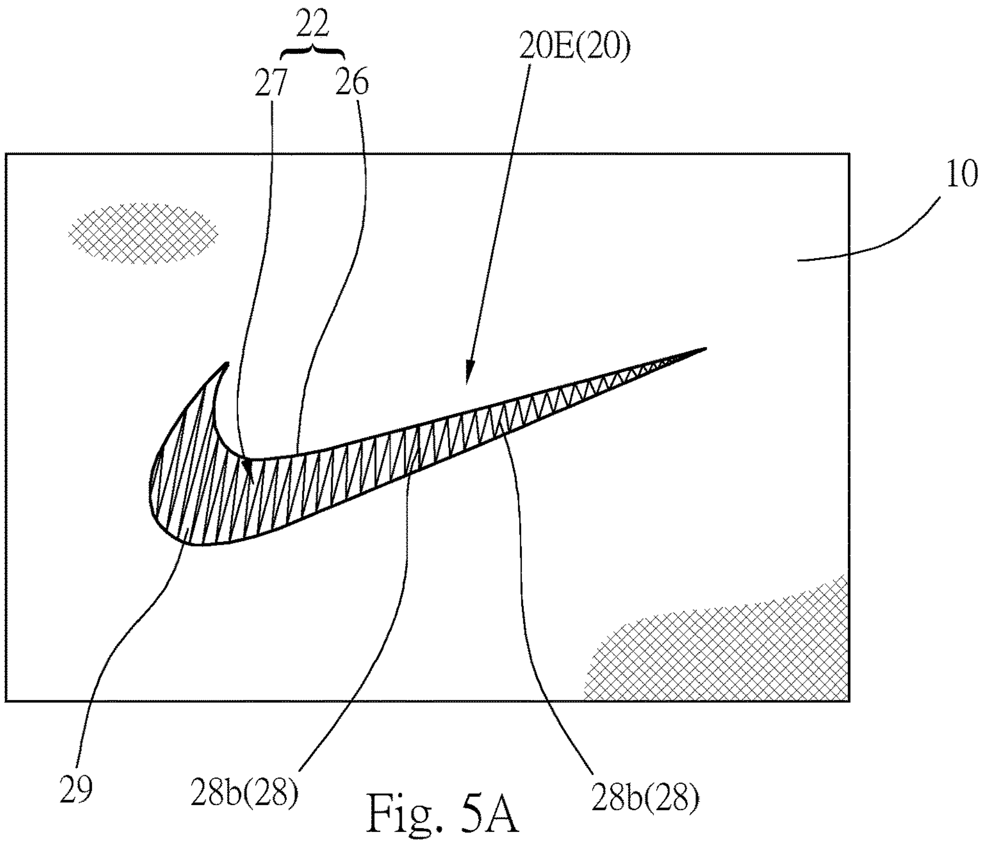
FIGS. 5A and 5B are views of the light-reflective mark of a third preferred embodiment of the invention, showing two graphic patterns of the light-reflective mark.
Figure 5B:
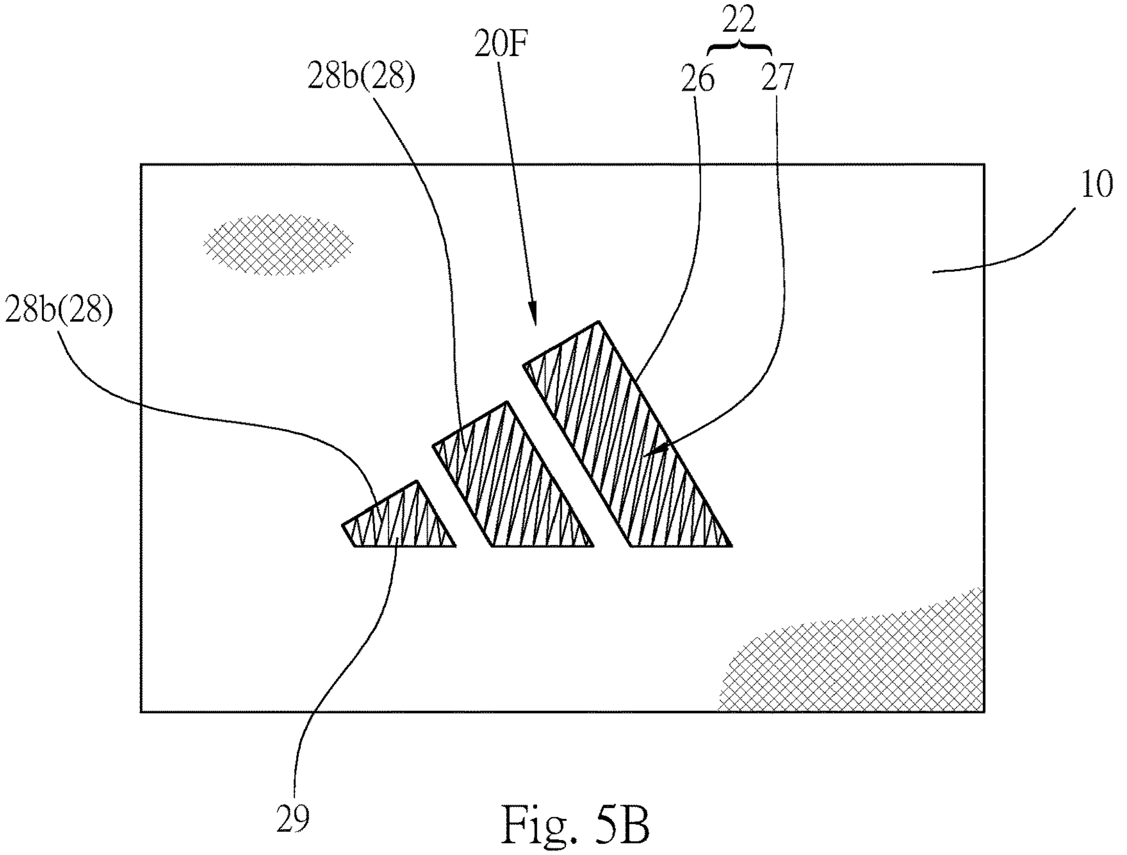
Figure 6A:
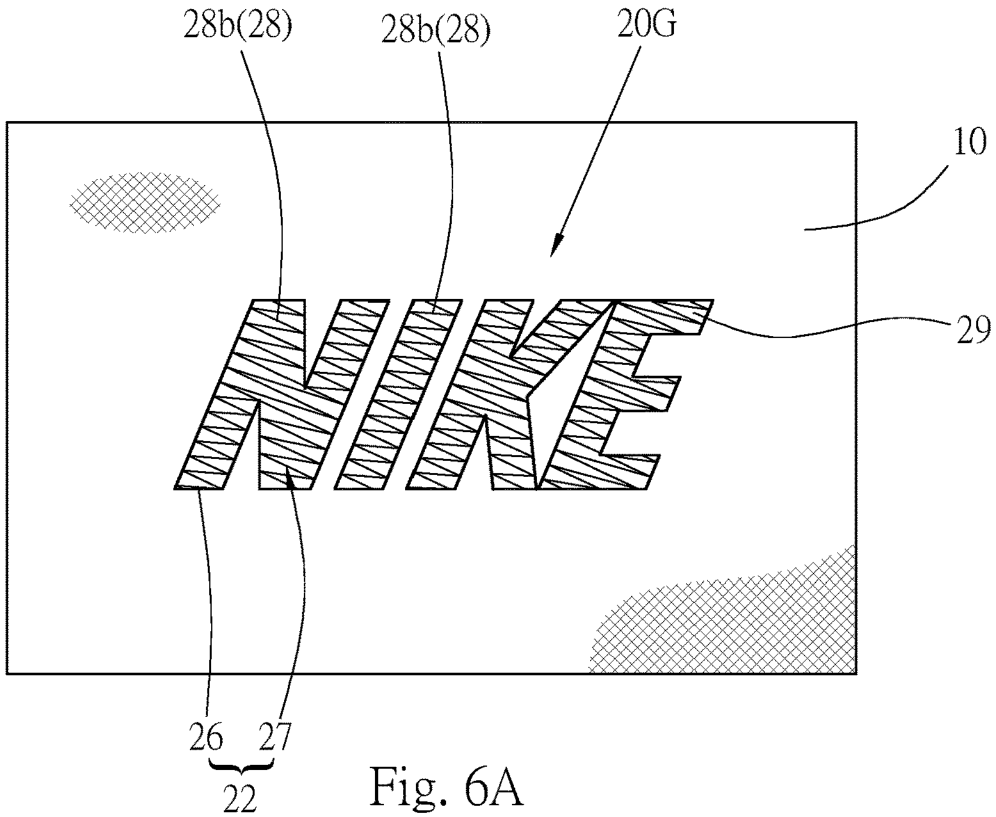
FIGS. 6A and 6B are views of the light-reflective mark of a fourth preferred embodiment of the invention, showing two text patterns of the light-reflective mark.
Figure 6B:
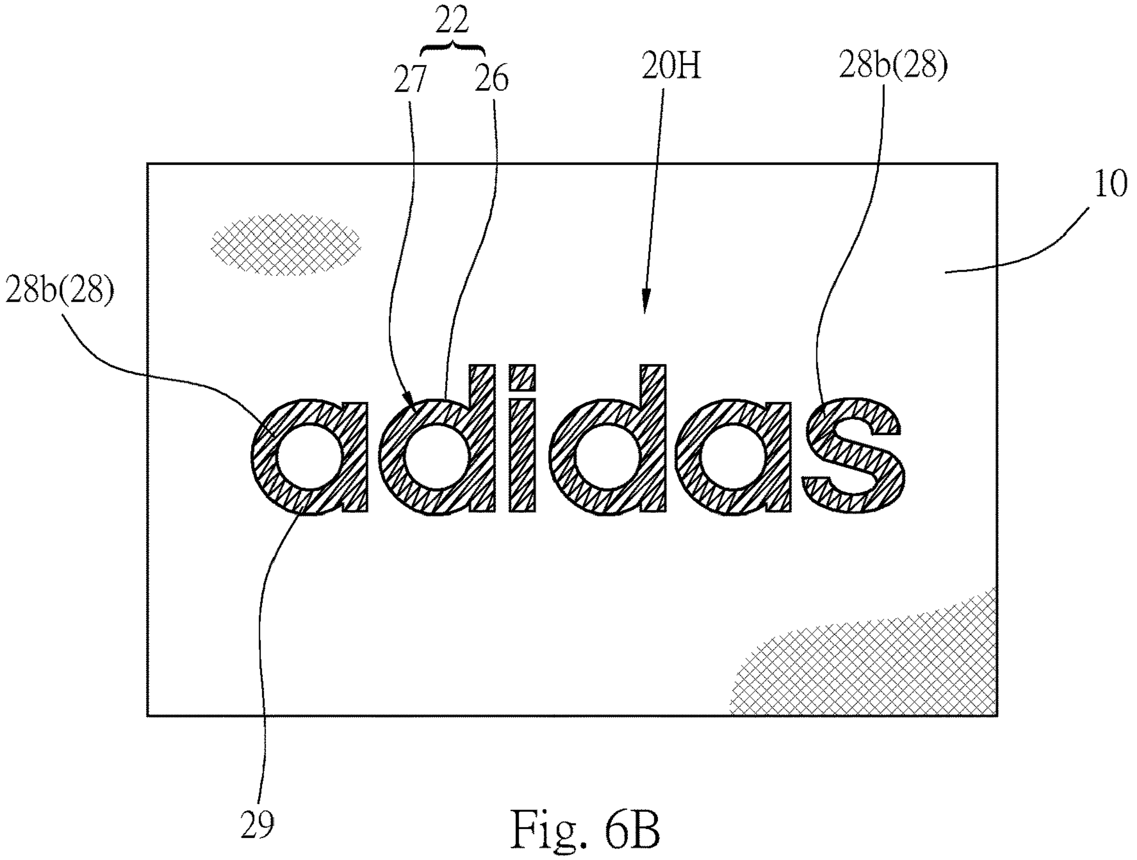

Please refer to FIG. 5 (FIG. 5A and FIG. 5B) and FIG. 6 (FIG. 6A and FIG. 6B) respectively for third and fourth preferred embodiments of light-reflective marks 20E, 20F, 20G, 20H provided by the invention. The light-reflective marks 20E, 20F, 20G, 20H are combined with the sheet material 10 through sewing with machine, electric embroidery or weaving. FIGS. 5A and 5B show the light-reflective marks 20E, 20F of graphic patterns, and FIGS. 6A and 6B show the light-reflective marks 20G, 20H of text patterns.

Taking the light-reflective mark 20E of FIG. 5A as an example, the lines of one or more than one light-reflective yarns 22 for forming the light-reflective mark 20E comprise the contour line 26 and the inner line 27, the contour line 26 constitutes an outer contour of the light-reflective mark 20E based on a shape of the light-reflective mark 20E, and the inner line 27 is disposed in the pattern of the light-reflective mark 20E according to a shape of the light-reflective mark 20E.

The inner line 27 has the line segments 28 (the line segments 28 in this preferred embodiment are represented by the reference numeral 28*b*), and the line segments 28 (28*b*) are lines and are spaced apart, and an interior of the light-reflective mark 20E is not completely filled with the line segments 28 (28*b*). Preferably, in addition to the gap 29, one end of each of the two adjacent line segments 28*b* are also connected with each other, so that the line segments 28*b* form a zigzag arrangement. The line segments 28*b* of the inner line 27 of each of the light-reflective marks 20F to 20H are disposed in a same manner as the line segments 28*b* of the light-reflective mark 20E, and the two adjacent line segments 28*b* are kept spaced apart. Two ends of each of the line segments 28(28*b*) are connected with the contour line 26.

In the embodiment of FIGS. 5 and 6, although the light-reflective marks 20E to 20H are not completely filled with the line segments 28*b* of the inner line 27, when the light-reflective marks 20E to 20H reflect light, through blooming or glowing of light, what others see are still the complete patterns of the light-reflective marks 20E to 20H.

Figure 7A:
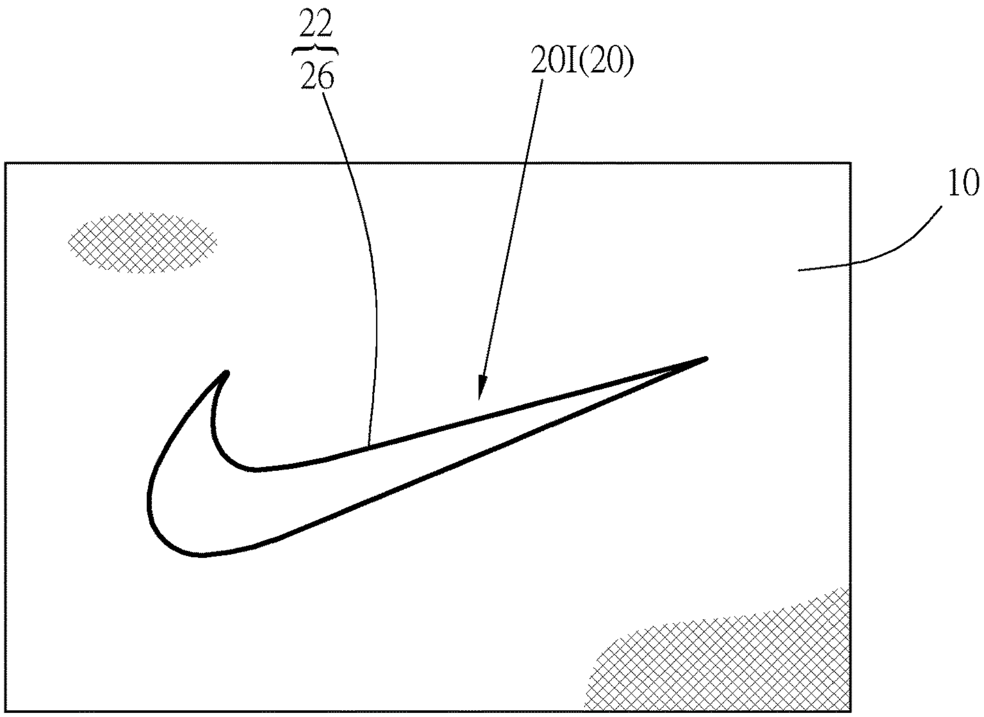
FIGS. 7A and 7B are views of the light-reflective mark of a fifth preferred embodiment of the invention, showing two graphic patterns of the light-reflective mark.
Figure 7B:
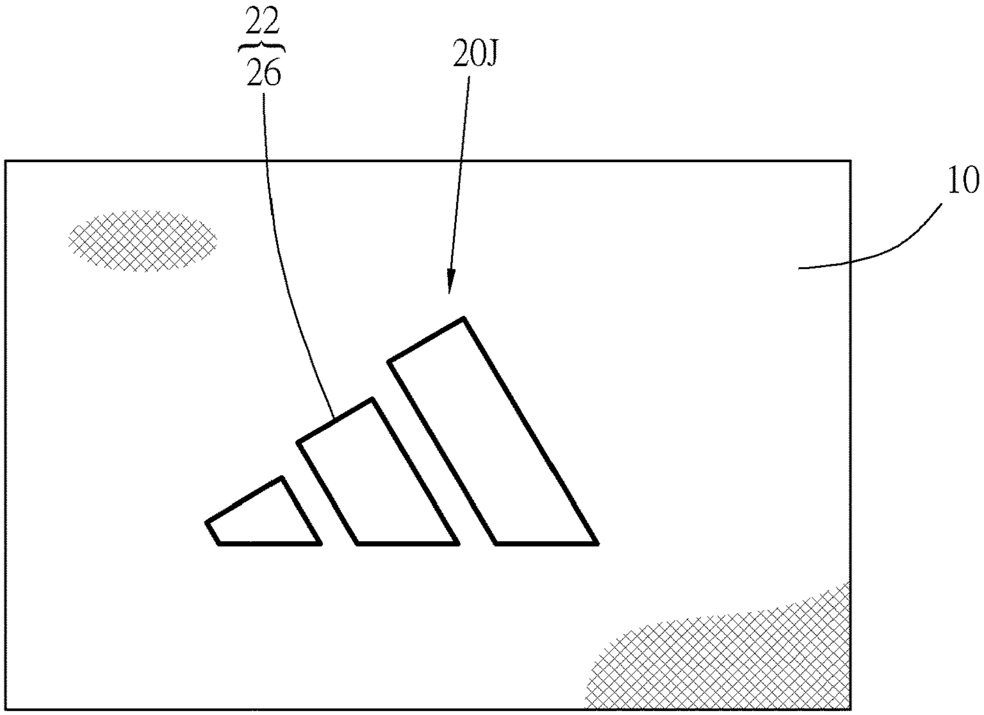
Figure 8A:
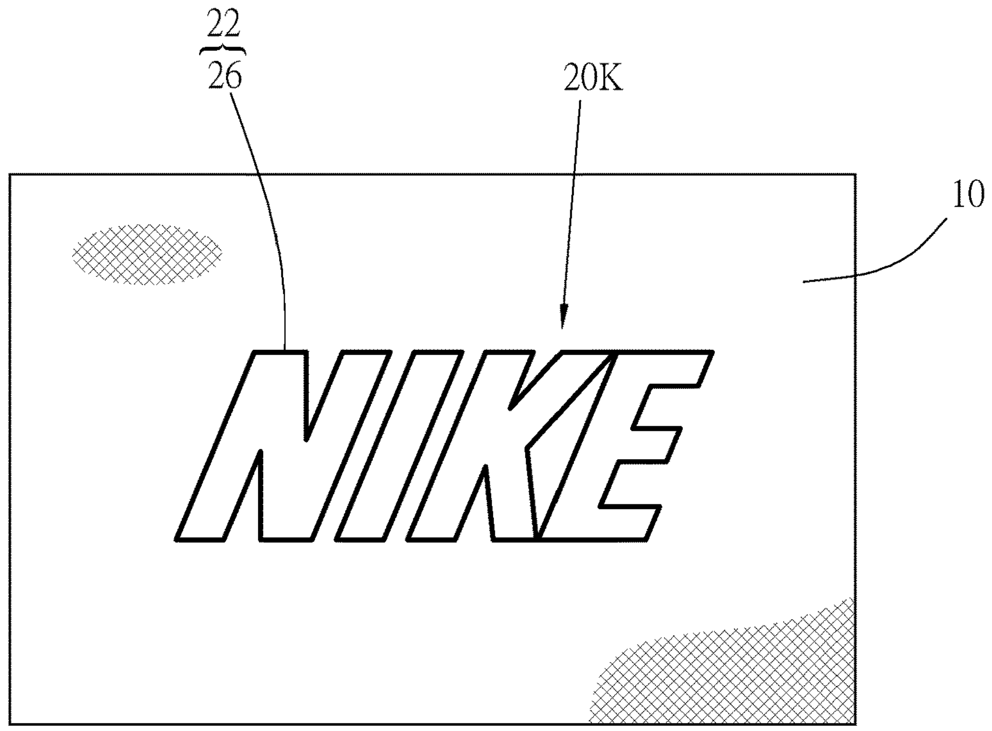
FIGS. 8A and 8B are views of the light-reflective mark of a sixth preferred embodiment of the invention, showing two text patterns of the light-reflective mark.
Figure 8B:
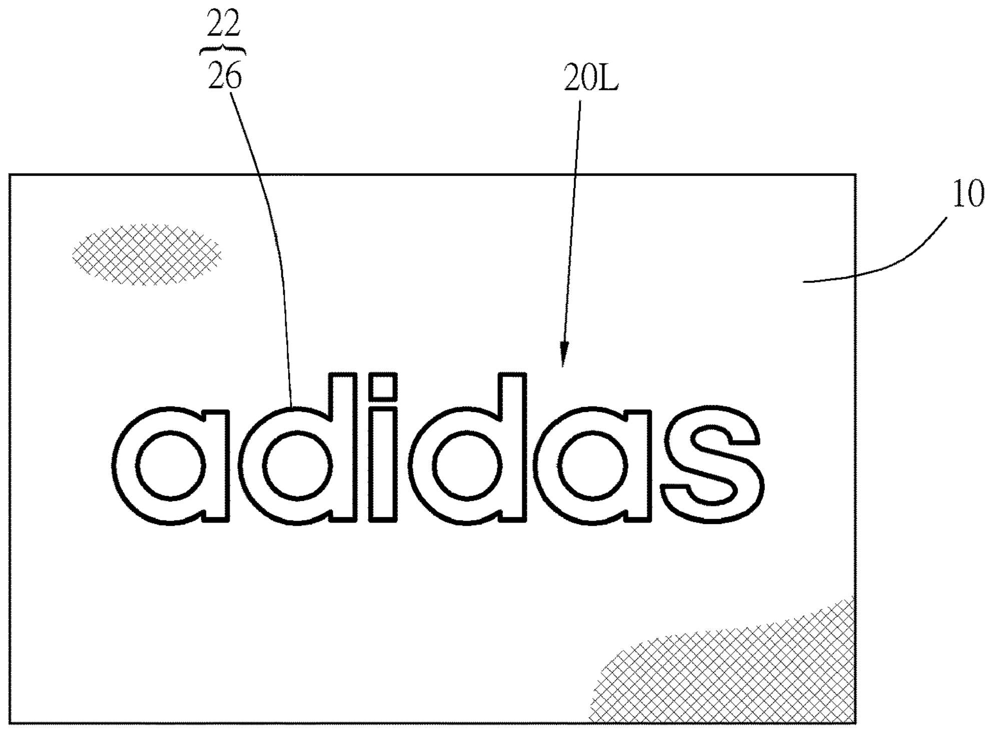

Please refer to FIG. 7 (FIG. 7A and FIG. 7B) and FIG. 8 (FIG. 8A and FIG. 8B) respectively for fifth and sixth preferred embodiments of light-reflective marks 20I, 20J, 20K, 20L provided by the invention. The light-reflective marks 20I, 20J, 20K, 20L are combined with the sheet material 10 through sewing with machine, electric embroidery or weaving. FIGS. 7A and 7B show the light-reflective marks 20I, 20J of graphic patterns, and FIGS. 8A and 8B show the light-reflective marks 20K, 20L of text patterns.

Taking the light-reflective mark 20I of FIG. 7A as an example, the light-reflective mark 20I uses one or more than one light-reflective yarns 22 make the contour line 26 according to an outer contour of the light-reflective mark 20I, and an inner line is not provided, that is, no line of the light-reflective yarn 22 is provided inside the light-reflective mark 20I. The line of the light-reflective yarn 22 that forms the light-reflective marks 20I to 20L of FIG. 7 and FIG. 8 is only the contour line 26.

When light irradiates each of the light-reflective marks 20I to 20L in FIGS. 7 and 8, the light-reflective marks 20I to 20L will reflect the light to provide a light-reflective effect and improve safety. Although no light-reflective yarn 22 is provided inside each of the light-reflective marks 20I to 20L, with the light-reflective yarns 22 of the outer contours of the light-reflective marks 20I to 20L, the light-reflective marks 20I to 20L still have a light-reflective effect, and what others see are still the graphic patterns or the text patterns of the light-reflective marks 20I to 20L.

Figure 9A:
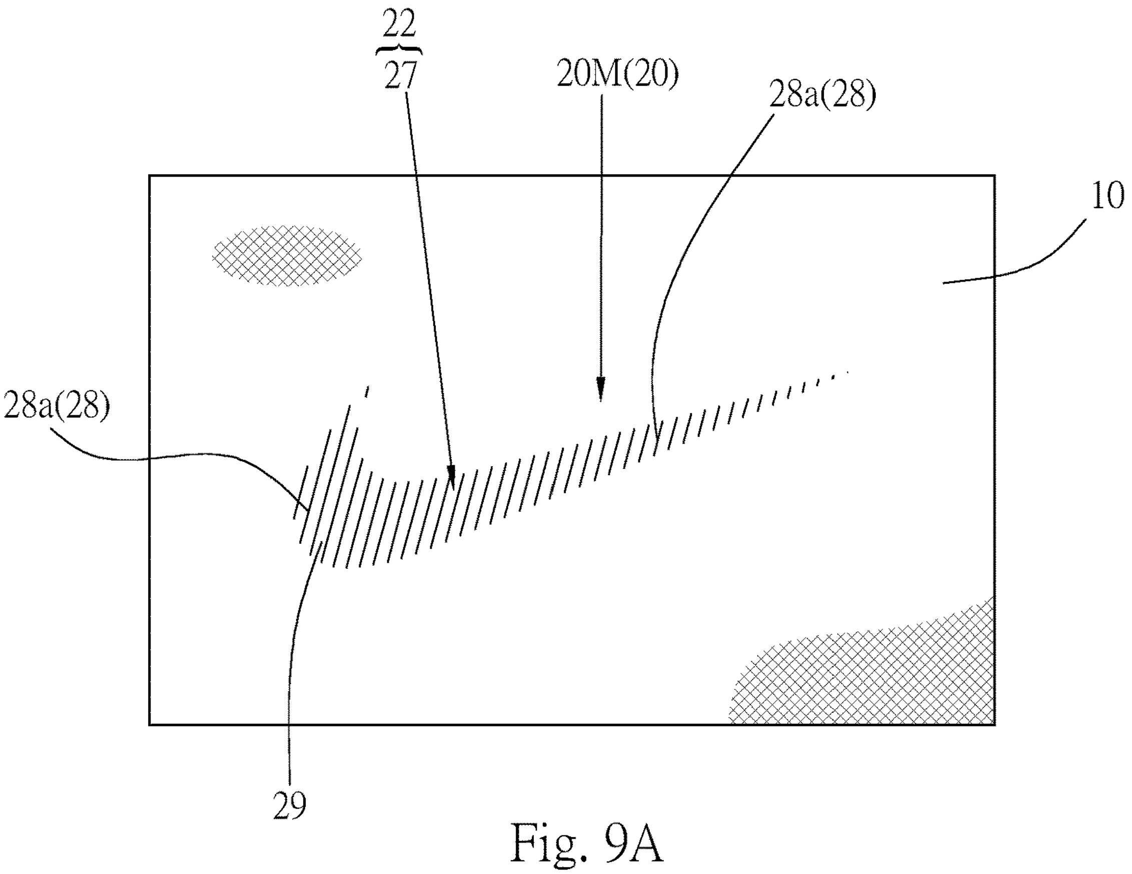
FIGS. 9A and 9B are views of the light-reflective mark of a seventh preferred embodiment of the invention, showing two graphic patterns of the light-reflective mark.
Figure 9B:
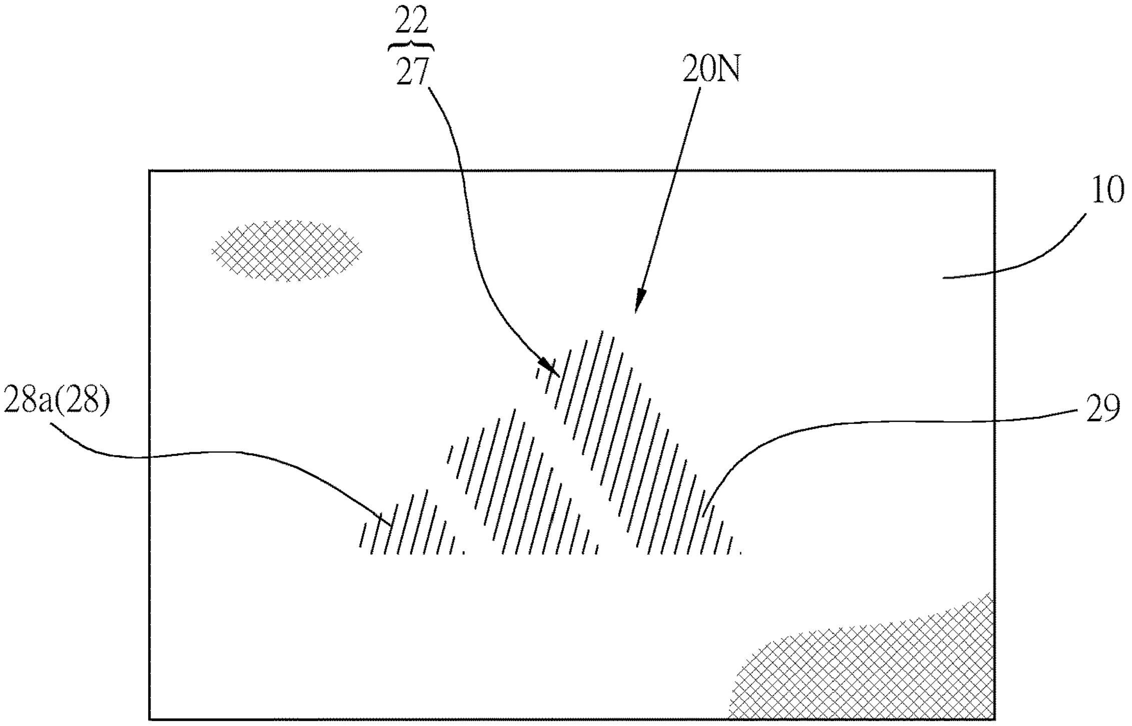
Figure 10A:
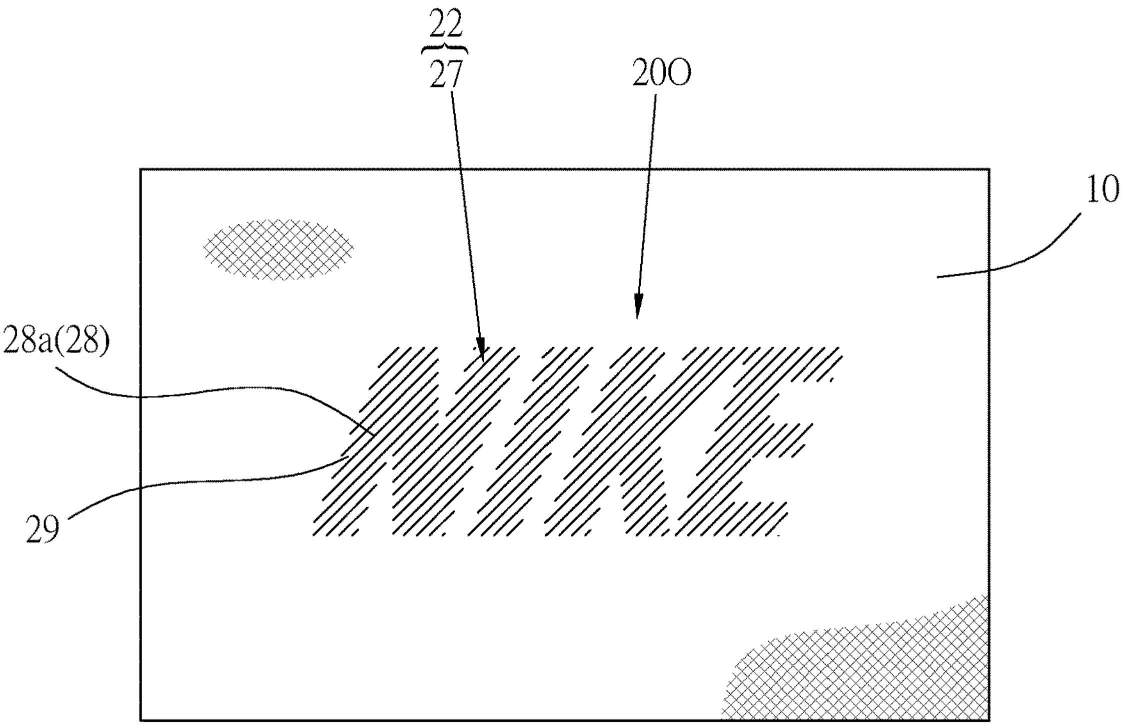
FIGS. 10A and 10B are views of the light-reflective mark of an eighth preferred embodiment of the invention, showing two text patterns of the light-reflective mark.
Figure 10B:
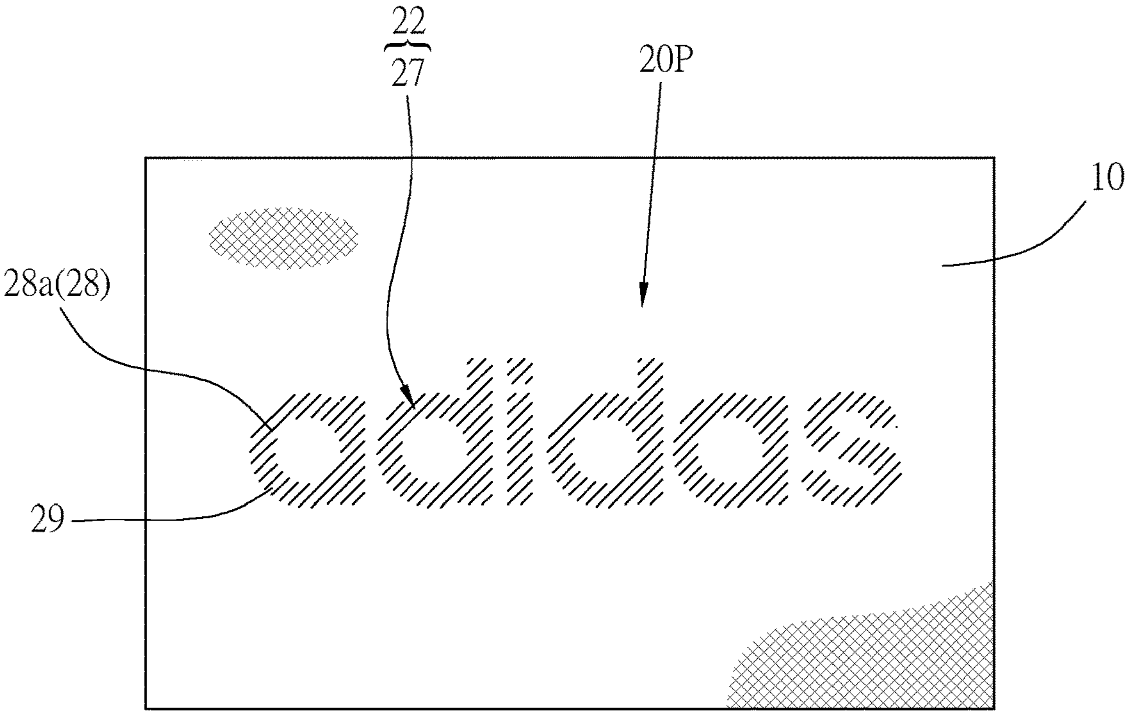

FIG. 9 (FIGS. 9A and 9B) and FIG. 10 (FIGS. 10A and 10B) are light-reflective marks 20M, 20N of graphic patterns and light-reflective marks 20O, 20P of text patterns respectively provided by seventh and eighth preferred embodiments of the invention, each of the light-reflective marks 20M to 20P is formed by combining the light-reflective yarn 22 or the light-reflective yarns 22 with the sheet material 10.

The line of the light-reflective yarn 22 that forms the light-reflective marks 20M to 20) of FIG. 9 and FIG. 10 is the inner line 27 only. Taking the light-reflective mark 20M of FIG. 9A as an example, the line of the light-reflective yarn 22 only has the inner line 27, which is made according to a shape of the pattern of the light-reflective mark 20M. Similarly, although the light-reflective mark 20M is not provided with a contour line, the inner line 27 is directly made into the pattern of the light-reflective mark 20M by sewing with machine, electric embroidery or weaving, and with the inner line 27, the light-reflective mark 20M has a clear shape and contour.

The inner line 27 has the line segments 28 (indicated by the reference numeral 28*a*), the line segments 28 (28*a*) are lines and are spaced apart, and the two adjacent line segments 28*a* are disposed in parallel, and a gap 29 is disposed between the two adjacent line segments 28*a*. The line segments 28*a* of the inner line 27 are located in the pattern of the light-reflective mark 20M, and disposition/arrangement of the line segments 28*a* constitute the pattern of the light-reflective mark 20M. The line segments 28*a* of the inner line 27 of each of the light-reflective marks 20N to 20P are disposed in a same manner as the line segment 28*a* of the light-reflective mark 20M.

When light irradiates the light-reflective marks 20M to 20P, the light-reflective marks 20M to 20P reflect light to improve safety. In the embodiment of FIG. 9 and FIG. 10, although the light-reflective marks 20M to 20P are not completely filled with the line segments 28*a* of the inner line 27, through blooming or glowing of light, what others see are still the complete patterns of the light-reflective marks 20M to 20P.

Figure 11A:
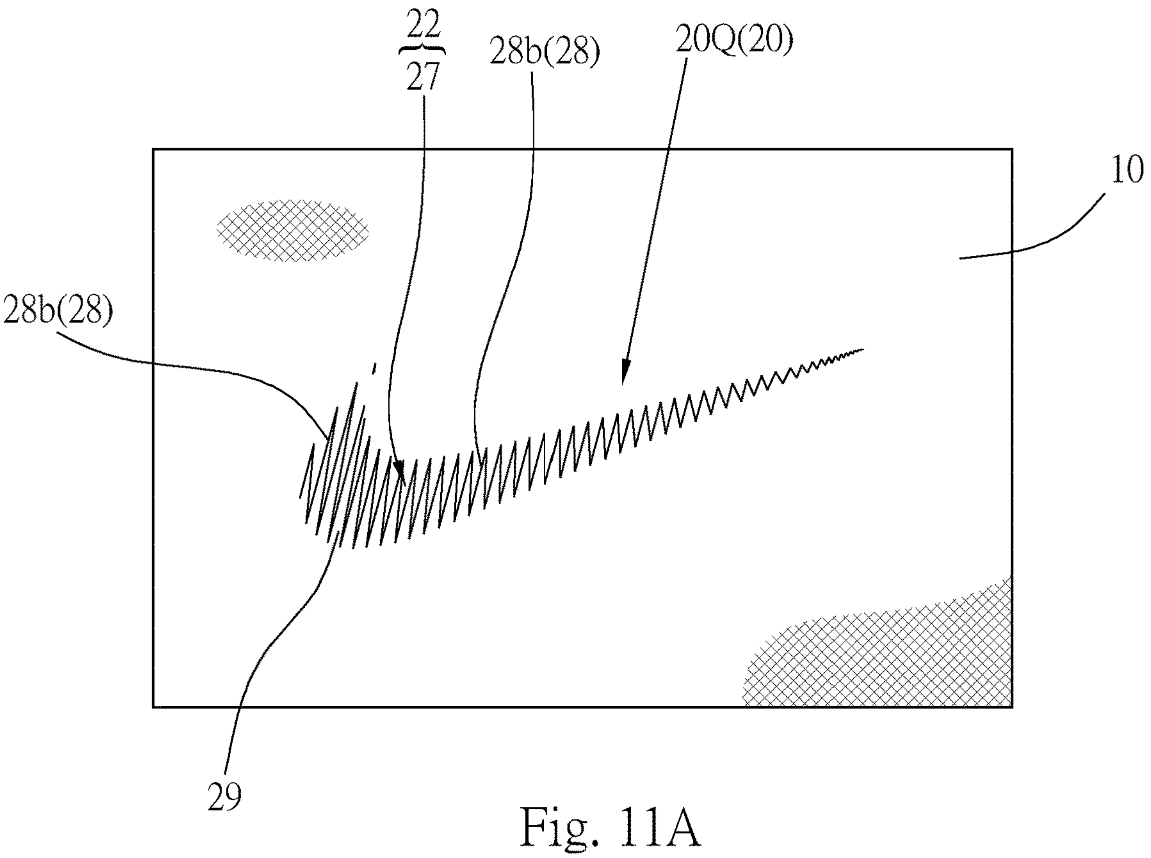
FIGS. 11A and 11B are views of the light-reflective mark of a ninth preferred embodiment of the invention, showing two graphic patterns of the light-reflective mark.
Figure 11B:
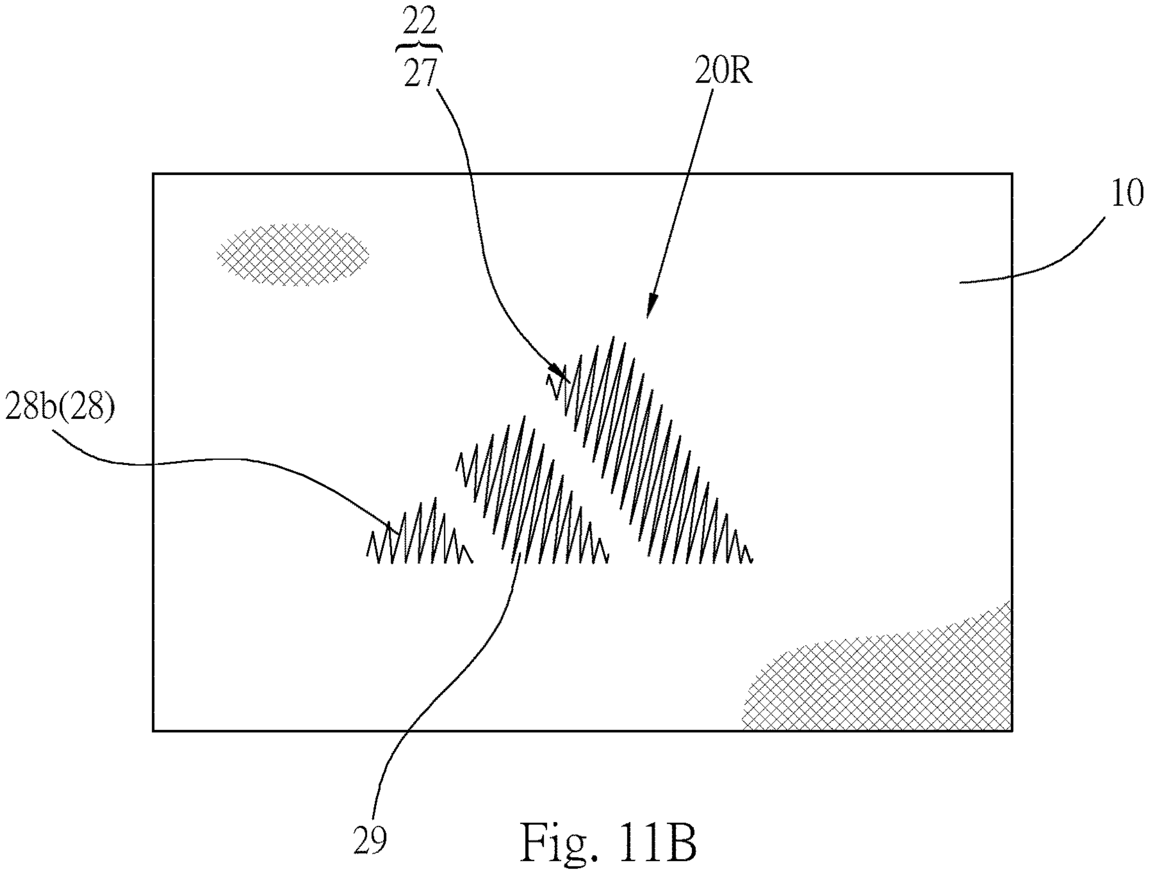
Figure 12A:
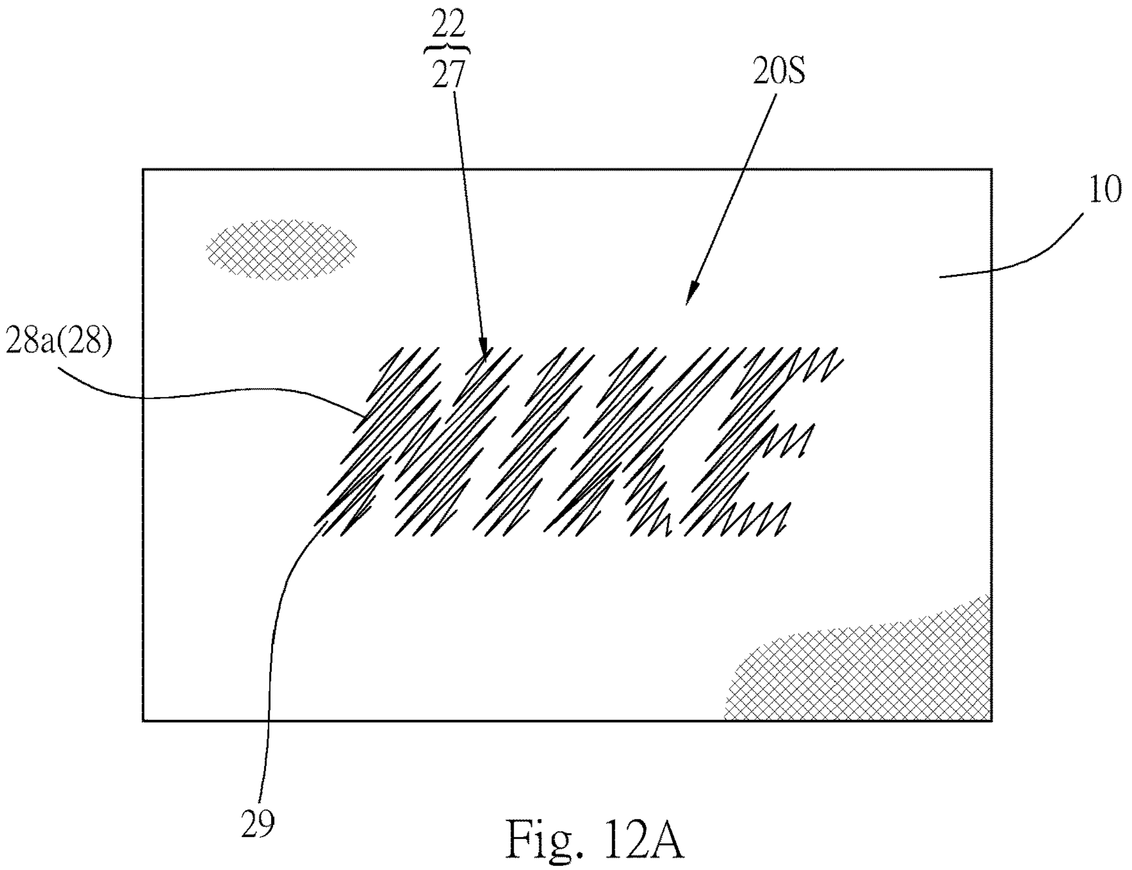
FIGS. 12A and 12B are views of the light-reflective mark of a tenth preferred embodiment of the invention, showing two text patterns of the light-reflective mark.
Figure 12B:
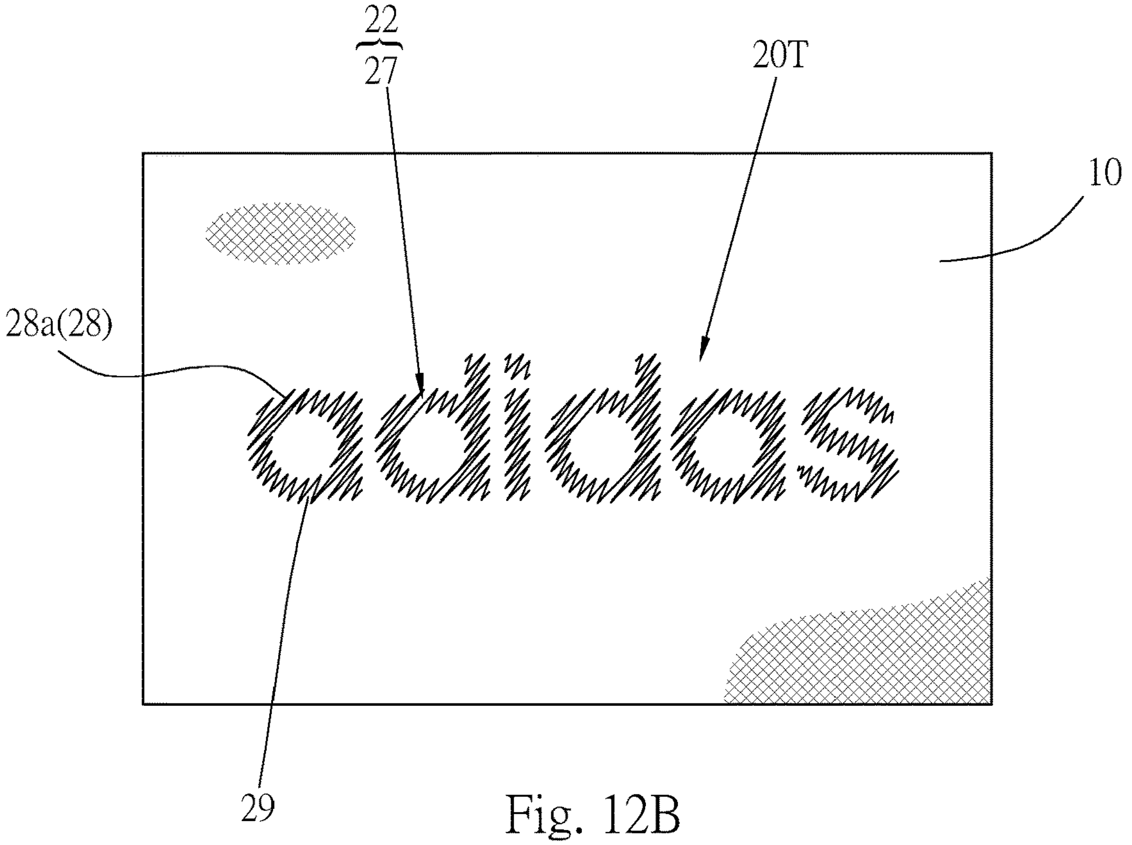

FIG. 11 (FIG. 11A and FIG. 11B) and FIG. 12 (FIG. 12A and FIG. 12B) are light-reflective marks 20Q, 20R of graphic patterns and light-reflective marks 20S, 20T of text patterns respectively provided by ninth and tenth preferred embodiments of the invention, each of the light-reflective marks 20Q to 20T is formed by combining one or more than one light-reflective yarns 22 with the sheet material 10.

Taking the light-reflective mark 20Q of FIG. 11A as an example, similarly, the light-reflective mark 20Q does not have a contour line, but only has the inner line 27 made according to a shape of the light-reflective mark 20Q. Although the light-reflective mark 20Q is not provided with a contour line, the inner line 27 is directly made into the pattern of the light-reflective mark 20Q, so that the light-reflective mark 20Q provides a clear shape and an outer contour.

The inner line 27 has the line segments 28 (the line segments 28 in this preferred embodiment are represented by the reference numeral 28*b*), and the line segments 28 (28*b*) are lines and are spaced apart, a gap 29 is disposed between the two adjacent line segments 28*b*, and one end of each of the two adjacent line segments 28*b* are also connected with each other, so that the line segments 28*b* form a zigzag arrangement. The line segments 28*b* of the inner line 27 are located in the pattern of the light-reflective mark 20Q, and disposition/arrangement of the line segments 28*b* form the pattern of the light-reflective mark 20Q. The line segments 28*b* of the inner line 27 of each of the light-reflective marks 20R to 20T are disposed in a same manner as the line segment 28*b* of the light-reflective mark 20Q.

When light irradiates the light-reflective marks 20Q to 20T, the light-reflective marks 20Q to 20T reflect light to improve safety. In the embodiment of FIGS. 11 and 12, although the light-reflective marks 20Q to 20T are not completely filled with the line segments 28*b* of the inner line 27, through blooming or glowing of light, what others see are still the complete patterns of the light-reflective marks 20Q to 20T.

Figure 13A:
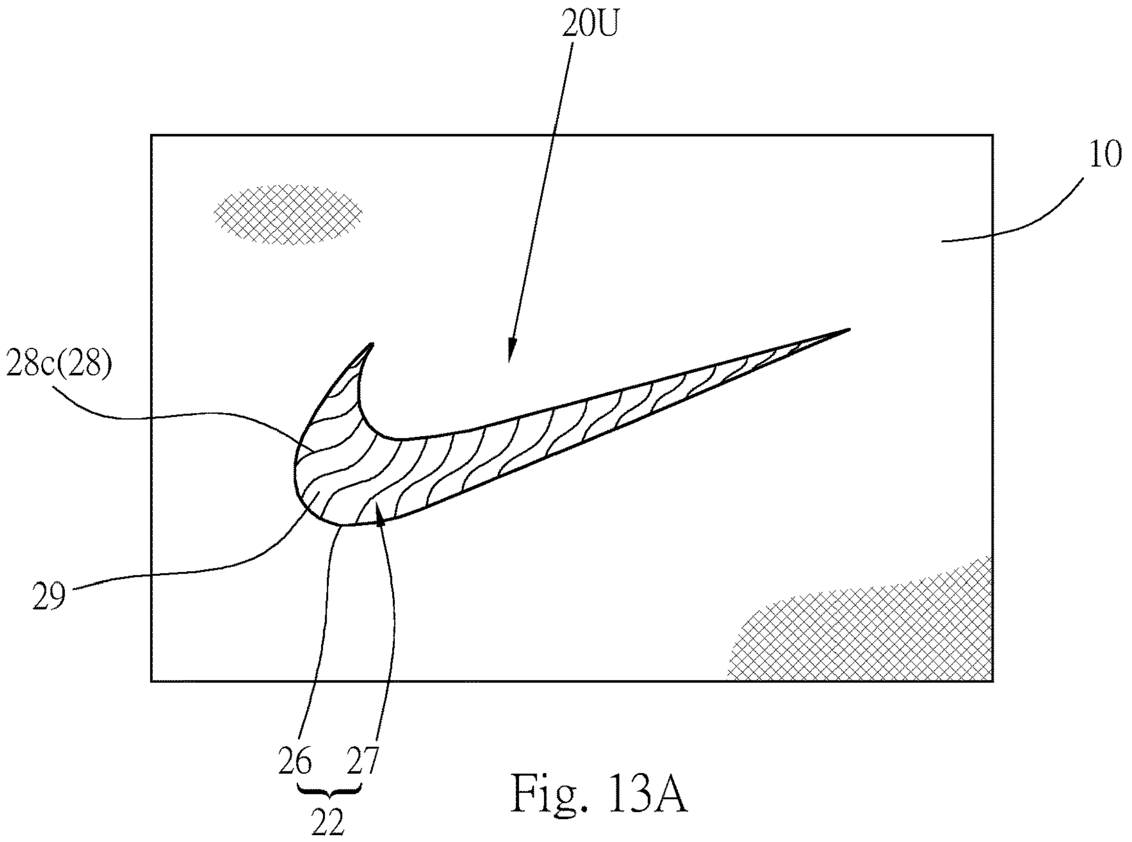
FIGS. 13A and 13B are views of the light-reflective mark of an eleventh preferred embodiment and a twelfth preferred embodiment of the invention.
Figure 13B:
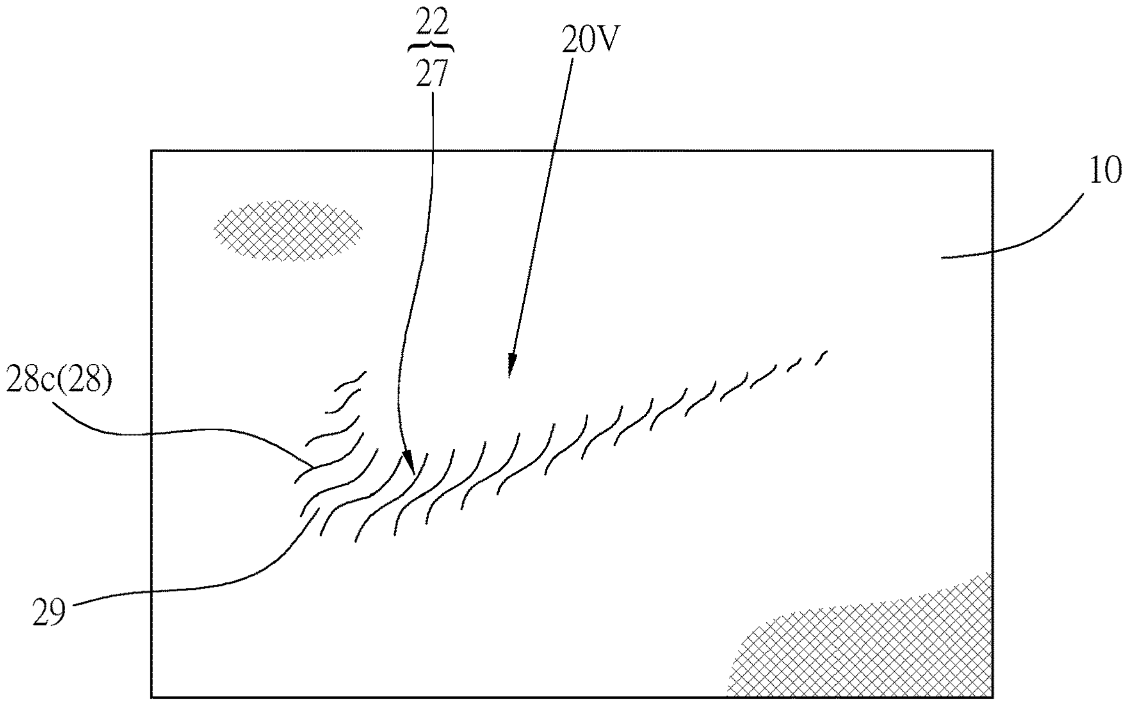

FIGS. 13A and 13B respectively show light-reflective marks 20U, 20V of eleventh and twelfth preferred embodiments of the invention. Wherein, the light-reflective mark 20U in FIG. 13A has the contour line 26 and the inner line 27, while the light-reflective mark 20V in FIG. 13B does not have a contour line and only has the inner line 27. Line segments 28*c* of the inner line 27 of the two light-reflective marks 20U, 20V are lines and are also disposed at intervals and provided with the gap 29, and the line segments 28*c* are wavy. In FIG. 13A, two ends of each of the line segments 28(28*c*) of the light-reflective mark 20U are connected with the contour line 26.

Although the light-reflective mark 20V of FIG. 13B does not have a contour line, the line segment 28*c* of the inner line 27 are disposed/arranged to form the pattern of the light-reflective mark 20V. When light irradiates the two light-reflective marks 20U, 20V, the patterns of the two light-reflective marks 20U, 20V that reflect light are the same due to blooming or glowing of light.

Figure 14A:
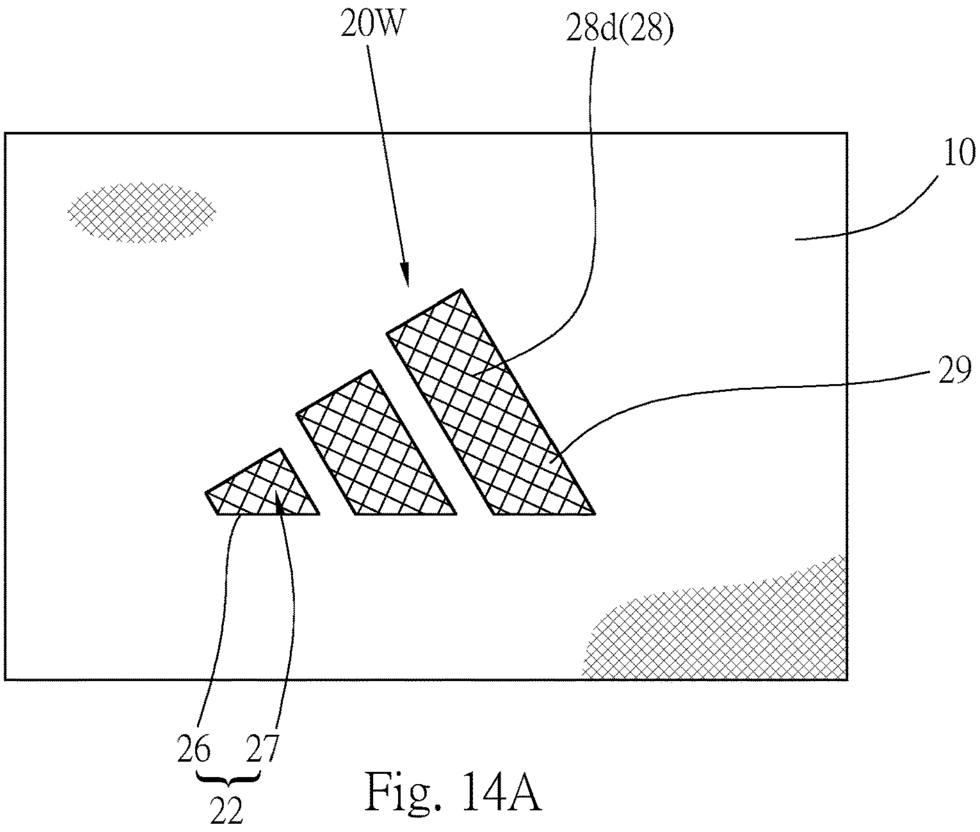
FIGS. 14A and 14B are views of the light-reflective mark of a thirteenth preferred embodiment and a fourteenth preferred embodiment of the invention.
Figure 14B:
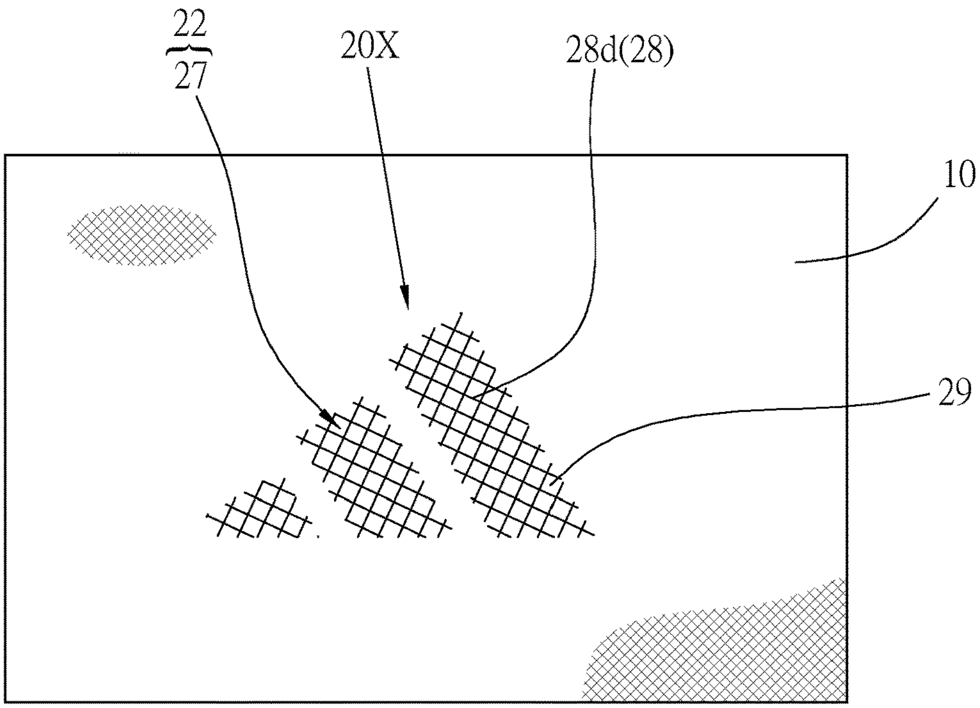

FIGS. 14A and 14B respectively show light-reflective marks 20W, 20X of thirteenth and fourteenth preferred embodiments of the invention. The difference is that the light-reflective mark 20W of FIG. 14A has the contour line 26, while the light-reflective mark 20X of FIG. 14B does not have a contour line. Line segments 28*d* of the inner line 27 of the two light-reflective marks 20W, 20X are lines and are also disposed at intervals and provided with the gap 29, and the line segments 28*d* are disposed in a grid shape. In FIG. 14A, two ends of each of the line segments 28(28*d*) of the light-reflective mark 20W are connected with the contour line 26.

Figure 15A:
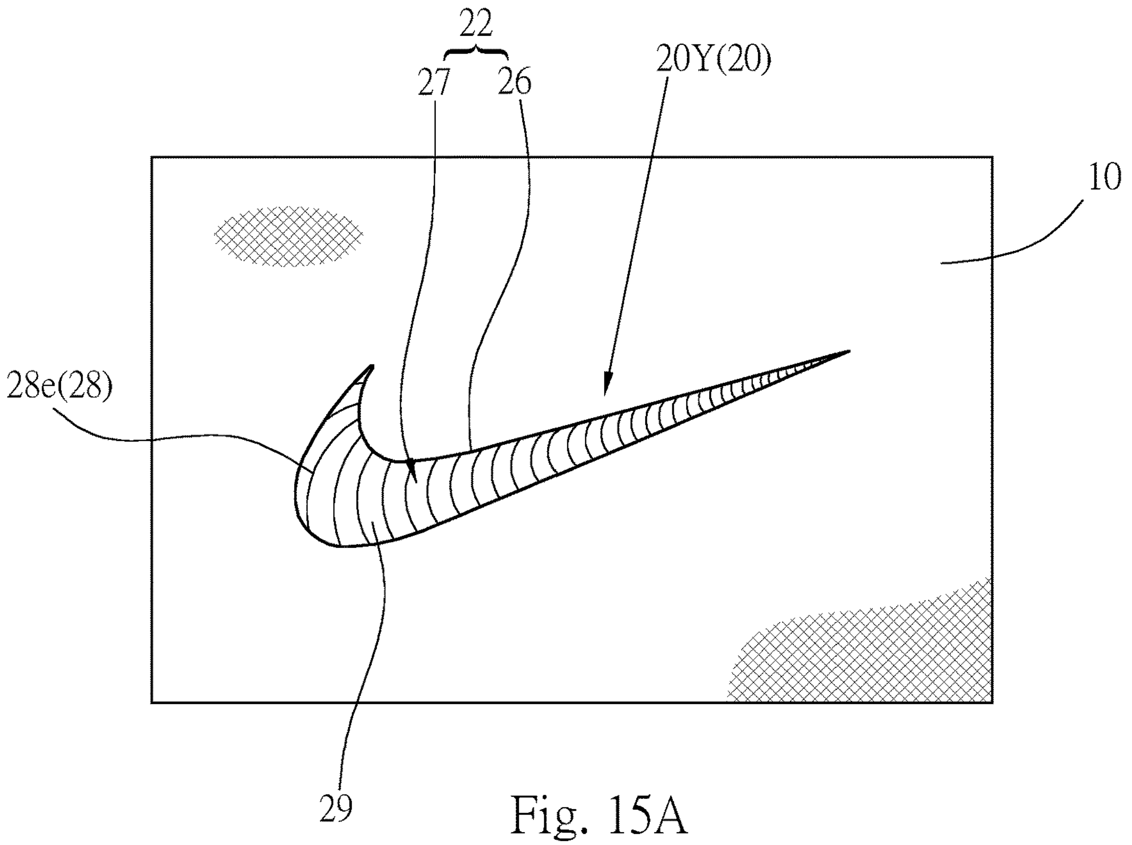
FIGS. 15A and 15B are views of the light-reflective mark of a fifteenth preferred embodiment and a sixteenth preferred embodiment of the invention.
Figure 15B:
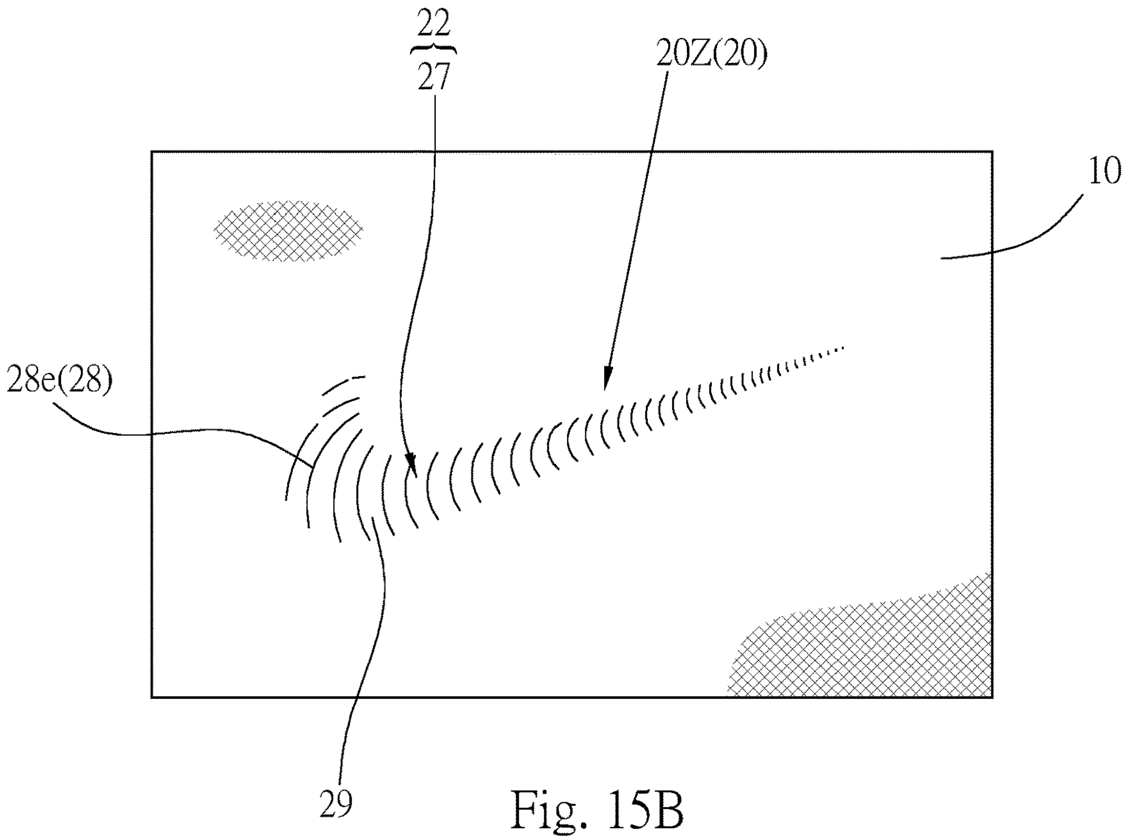

FIGS. 15A and 15B respectively show light-reflective marks 20Y, 20Z of fifteenth and sixteenth preferred embodiments of the invention. The light-reflective mark 20Y in FIG. 15A has the contour line 26, while the light-reflective mark 20Z in FIG. 15B does not have a contour line. Line segments 28*e* of the inner line 27 of the two light-reflective marks 20Y, 20Z are lines and are disposed at intervals, and the line segments 28*e* are arcuate. In FIG. 15A, two ends of each of the line segments 28(28*e*) of the light-reflective mark 20Y are connected with the contour line 26.

Although the light-reflective marks 20 shown in FIG. 13 to FIG. 15 are exemplified as the graphic patterns, the line segments 28 can also be applied to the text patterns.

Figure 16:
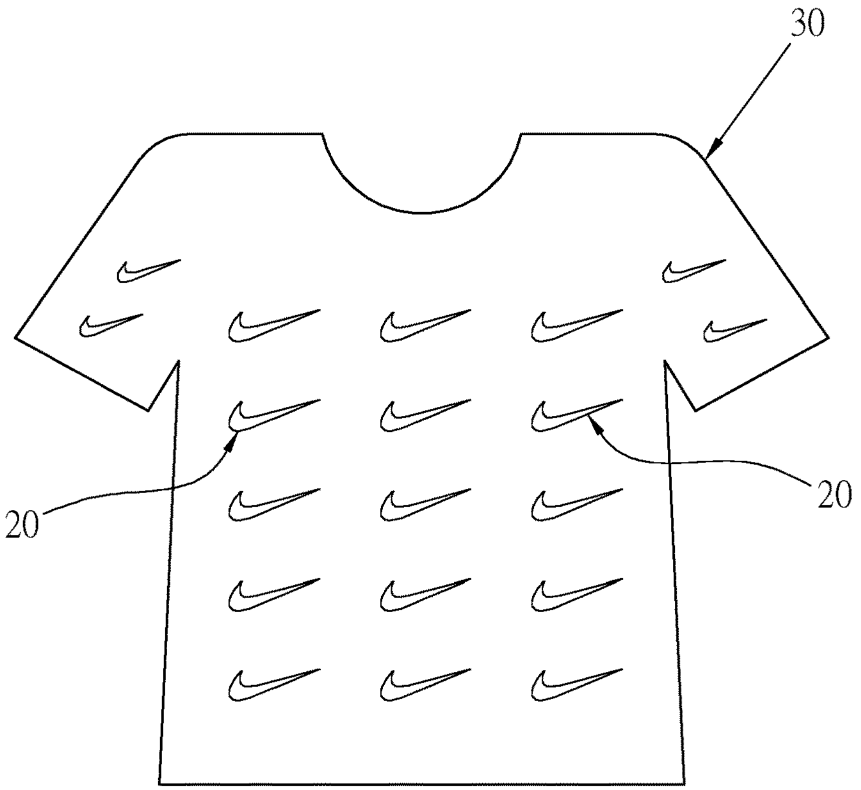
FIG. 16 shows an implementation mode of the light-reflective mark of the invention, showing that the light-reflective marks are combined on an article.

Please refer to FIG. 16, in implementation, the light-reflective marks 20 according to any one of the preferred embodiments of the invention can be disposed on an article 30 to fully improve a light-reflective effect of the article 30, and when the light-reflective mark 20 is a trademark logo or an aesthetic pattern, the light-reflective mark 20 will not be obtrusive, and makes the article 30 fashionably pleasing for using in various occasions.

Figure 17:
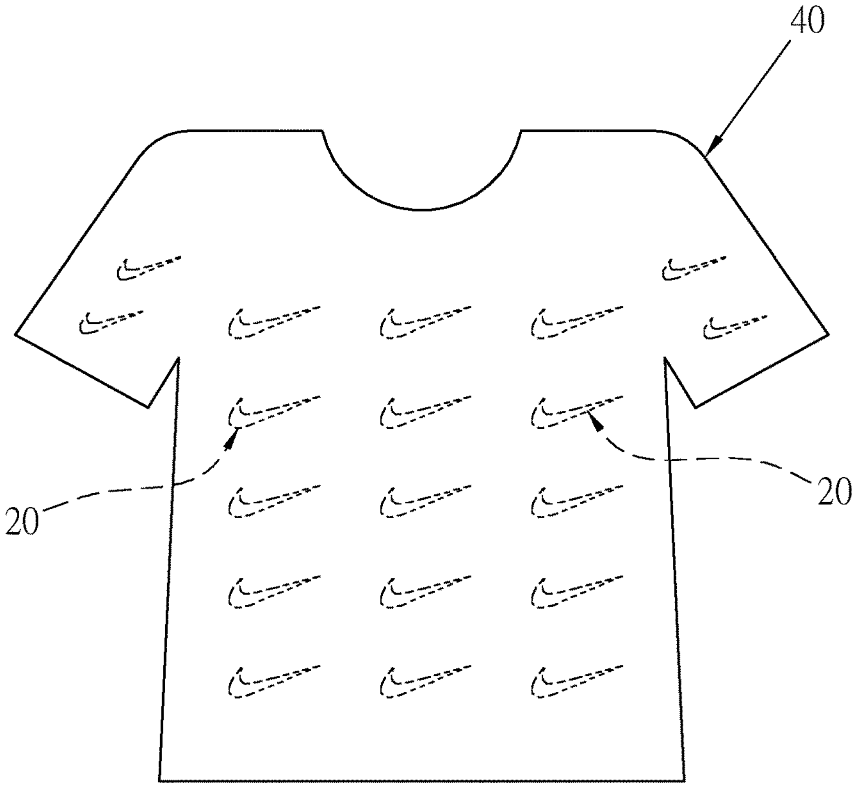
FIG. 17 is a schematic diagram showing the light-reflective marks of the invention being hidden in a knitted article.

In addition, please refer to FIG. 17, when the light-reflective mark 20 of the invention is formed on a knitted fabric (knitted article) 40 by weaving, such as clothes, pants, hats, socks, sports shoes, etc., the light-reflective yarn 22 can be woven together with ordinary yarns of a same color. In this way, the light-reflective mark 20 woven and formed with the light-reflective yarn 22 is as if hidden in the knitted fabric 40, and will not be particularly eye-catching or obtrusive. When light irradiates the knitted fabric 40, the light-reflecting marks 20 become obvious by reflecting light. The light-reflective mark 20 formed by sewing with machine or electric embroidery will protrude from a surface of the article (the knitted fabric 40); and the light-reflective mark 20 formed by weaving does not protrude from a surface of the knitted fabric 40.

The invention uses the light-reflective yarn 22 to make the light-reflective mark on articles or knitted fabrics that can be sewn with machine or electrically embroidered, so that people's daily supplies are provided with safety.

The technical means represented by the invention includes making the light-reflective yarn not filling up the pattern of the light-reflective mark completely, and still being capable of reflecting light from the complete pattern. There are several objects for making the light-reflective yarn not filling up the light-reflective mark completely. Firstly, since the light-reflective yarn has the glass microbeads, and a texture of the glass microbead is hard and a specific weight thereof is high, the light-reflective yarn is heavy and hard; if the pattern of the light-reflective mark is completely embroidered or filled with the light-reflective yarn, a weight of clothing will increase, and the clothing will become hard and uncomfortable to wear. The method of disposing the light-reflective yarn at intervals in the invention is capable of reducing the weight, reducing the burden of wearing, and making the clothing softer and more comfortable to wear. Furthermore, a price of the light-reflective yarn is higher than that of ordinary yarn, if the pattern of the light-reflective mark is completely filled, it will increase the cost of the clothing, resulting in fewer people using it, and public safety will be compromised. This is undesirable for the applicant of the invention, so the invention adopts the technical means of not filling the pattern of the light-reflective mark completely, which not only can still achieve the light-reflective effect, but can also reduce an amount of the light-reflective yarn used, reduce the cost of the clothing, allow more people to use the light-reflective clothing, and improve public safety.

It is to be understood that the above description is only the embodiments of the invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A light-reflective mark formed with light-reflective yarn comprising:

a sheet material being an article capable of being sewn or embroidered or a knitted fabric; and a light-reflective mark being a graphic pattern or a text pattern or a pattern composed of graphics and texts, the light-reflective mark being formed by combining one light-reflective yarn or more than one light-reflective yarns with the sheet material by sewing, embroidery or weaving, a line or lines of the light-reflective yarn constituting the pattern of the light-reflective mark, the line of the reflective yarn that forming the light-reflective mark being spaced apart in the pattern and the pattern of the light-reflective mark being not completely filled with said line of the light-reflective yarn.

2. The light-reflective mark as claimed in claim 1, wherein said line of the light-reflective yarn comprises a contour line forming an outer contour of the pattern and an inner line disposed in the pattern, and the pattern of the light-reflective mark is not completely filled with the inner line.

3. The light-reflective mark as claimed in claim 2, wherein the inner line has a plurality of line segments disposed in the pattern of the light-reflective mark, and the line segments have intervals.

4. The light-reflective mark as claimed in claim 1, wherein said line of the light-reflective yarn is a contour line of the outer contour of the pattern of the light-reflective mark.

5. The light-reflective mark as claimed in claim 1, wherein said line of the light-reflective yarn is located in the pattern of the light-reflective mark and forms an inner line of the pattern.

6. The light-reflective mark as claimed in claim 5, wherein the inner line has a plurality of line segments, and the line segments are disposed at intervals in the pattern of the light-reflective mark.

7. The light-reflective mark as claimed in claim 1, wherein the sheet material is a knitted fabric; yarns woven into the knitted fabric comprise the light-reflective yarn, and the light-reflective mark is woven and formed with the light-reflective yarn.

8. The light-reflective mark as claimed in claim 3, wherein the line segments of the inner line are straight, wavy, arcuate, or in a grid shape.

9. The light-reflective mark as claimed in claim 6, wherein the line segments of the inner line are straight, wavy, arcuate, or in a grid shape.

10. The light-reflective mark as claimed in claim 1, wherein a width of the line of the light-reflective yarn is between 0.05 mm and 12 mm.

11. The light-reflective mark as claimed in claim 3, wherein two ends of each of the line segments are connected with said contour line.

12. The light-reflective mark as claimed in claim 1, wherein a top surface and a bottom surface of the light-reflective yarn respectively have a light-reflective layer, each of the light-reflective layers has a plurality of glass microbeads.

* * * * *